United States Patent
Shibuya et al.

(10) Patent No.: US 8,300,546 B2
(45) Date of Patent: Oct. 30, 2012

(54) WIRELESS COMMUNICATION TERMINAL AND CONNECTION SETUP METHOD FOR USE IN WIRELESS NETWORK

(75) Inventors: Kazuyuki Shibuya, Sagamihara (JP); Hitoshi Tsuchiya, Tokyo (JP); Akihiko Sakamoto, Tokyo (JP)

(73) Assignee: Olympus Corporation, Tokyo (JP)

( * ) Notice: Subject to any disclaimer, the term of this patent is extended or adjusted under 35 U.S.C. 154(b) by 297 days.

(21) Appl. No.: 12/648,860

(22) Filed: Dec. 29, 2009

(65) Prior Publication Data

US 2010/0189012 A1 Jul. 29, 2010

(30) Foreign Application Priority Data

Jan. 29, 2009 (JP) ................................. 2009-017521

(51) Int. Cl.
*H04L 12/56* (2006.01)
*H04J 1/16* (2006.01)
(52) U.S. Cl. ......... 370/252; 370/230; 370/254; 370/260
(58) Field of Classification Search .................. 370/254, 370/252, 260, 230
See application file for complete search history.

(56) References Cited

U.S. PATENT DOCUMENTS

| | | | |
|---|---|---|---|
| 2005/0190733 A1* | 9/2005 | Ishidoshiro | 370/338 |
| 2007/0184837 A1* | 8/2007 | Hohl et al. | 455/435.1 |
| 2009/0113489 A1* | 4/2009 | O'Neil | 725/62 |
| 2009/0179983 A1* | 7/2009 | Schindler | 348/14.08 |

FOREIGN PATENT DOCUMENTS

JP 2008-270892 A 11/2008

OTHER PUBLICATIONS

Wi-Fi Protected Setup (TM) Specification 1.0, pp. 77-83.
"IEEE Std 802.11-2007", IEEE Computer Society, pp. 419-435, Jun. 12, 2007.

* cited by examiner

*Primary Examiner* — John Pezzlo
(74) *Attorney, Agent, or Firm* — Westerman, Hattori, Daniels & Adrian, LLP

(57) ABSTRACT

A wireless communication terminal comprises a trigger reception section, a join request reception section, and a connection setup section. The trigger reception section receives a predetermined trigger. The join request reception section receives a join request to a wireless network by wireless communication from an external terminal which doesn't join the wireless network of the wireless communication terminal. The connection setup section which performs connection setup to join the wireless network for each join request received by the join request reception section from a plurality of external terminals during a reception period corresponding to one trigger received by the trigger reception section, and doesn't perform the connection setup for the join request received from the external terminal after expiration of the reception period.

8 Claims, 23 Drawing Sheets

FIG. 17
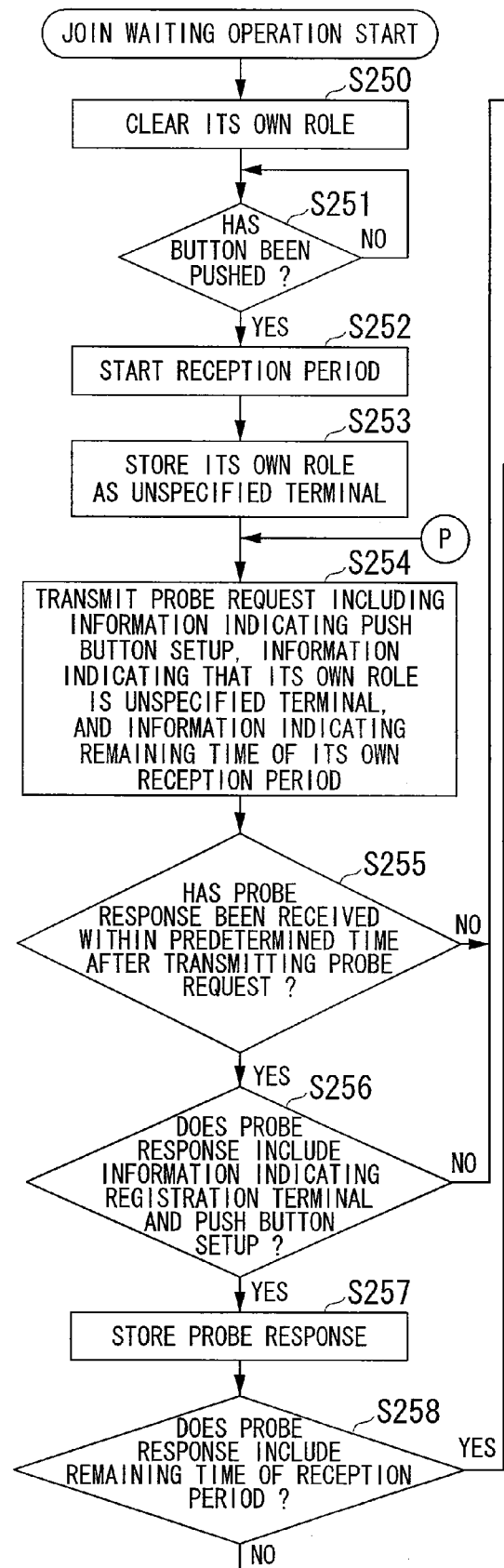
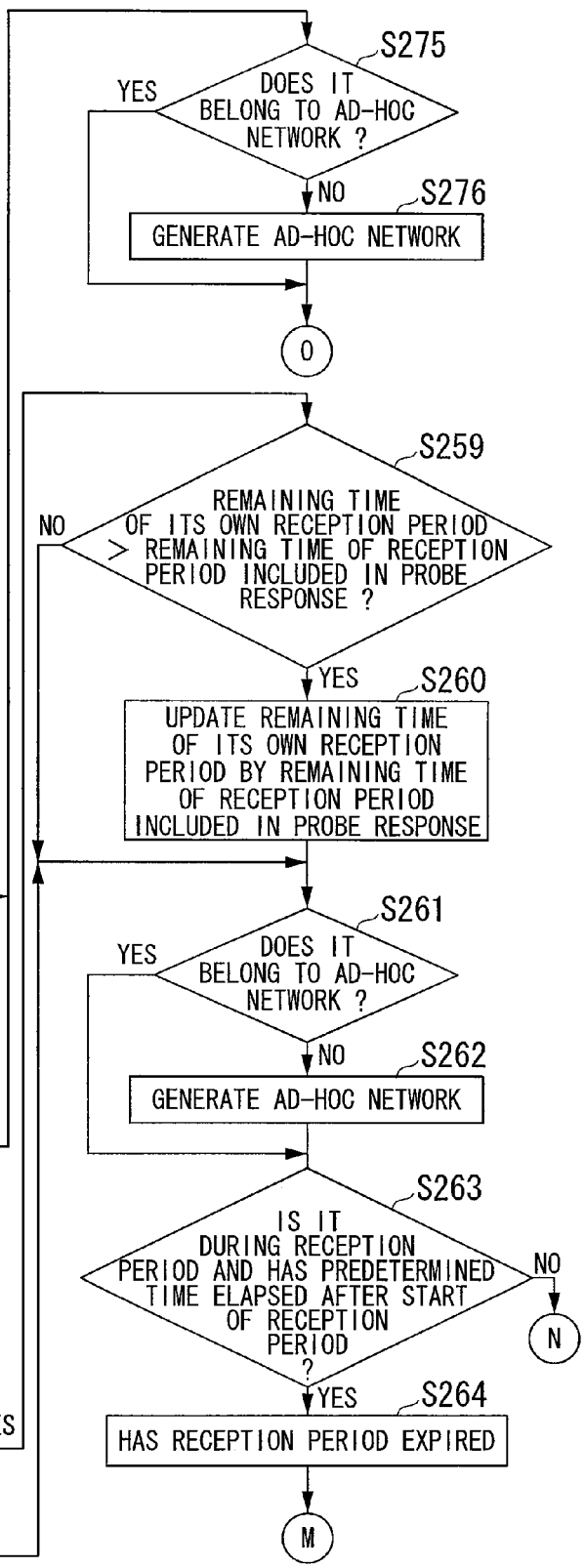

WIRELESS COMMUNICATION TERMINAL AND CONNECTION SETUP METHOD FOR USE IN WIRELESS NETWORK

BACKGROUND OF THE INVENTION

1. Field of the Invention

The present invention relates to a wireless communication terminal and a connection setup method for use in a wireless network, which simply and easily perform connection setup when a wireless communication device joins the wireless network.

Priority is claimed on Japanese Patent Application No. 2009-017521, filed Jan. 29, 2009, the content of which is incorporated herein by reference.

2. Description of Related Art

In general, when a communication terminal having a wireless LAN function joins a network (infrastructure network) provided by an access point (hereinafter, abbreviated as AP), it is necessary to perform the setup of a wireless connection and security for the communication terminal. This requires the input of various settings on the communication terminal. Since the performing the setup and inputting are complex, it is particularly difficult for a user unfamiliar with a wireless LAN technology to perform the setup.

To this problem, Wi-Fi Protected Setup™ Specification 1.0 (hereinafter, abbreviated as WPS) has been published as a technology of a wireless LAN standard for easily setting up a wireless connection and security, and making a communication terminal join an infrastructure network. For example, the WPS is available from https://www.wi-fi.org/knowledge_center_overview.php?type=4.

In the WPS, a user is able to perform the setup by pushing a real button or a button on a screen having a GUI function (Graphical User Interface function) in each of an external terminal having a wireless LAN function and desiring to join a network and a communication terminal first joining the network and having a function capable of making the external terminal join the network. IEEE Std. 802.11™-2007 published on http://standards.ieee.org/getieee802/download/802.11-2007.pdf discloses a communication method in an infrastructure mode in which communication is performed through an infrastructure network.

SUMMARY

In one aspect of the present invention, there is provided a wireless communication terminal that includes at least: a trigger reception section which receives a predetermined trigger; a join request reception section which receives a join request to a wireless network by wireless communication from an external terminal which doesn't join the wireless network of the wireless communication terminal; and a connection setup section which performs connection setup to join the wireless network for each join request received by the join request reception section from a plurality of external terminals during a reception period corresponding to one trigger received by the trigger reception section, and doesn't perform the connection setup for the join request received from the external terminal after expiration of the reception period.

In the wireless communication terminal, preferably, the connection setup section may prevent the reception period from being extended during the reception period.

More preferably, the connection setup section may shorten the reception period on the basis of information attached to the join request.

Preferably, the connection setup section may perform the connection setup during the reception period or after the expiration of the reception period.

Preferably, the wireless communication terminal may further comprise a storage section which stores join request information regarding the join request received from the external terminal within the reception period, and the connection setup section may perform the connection setup for each of the plurality of external terminals from which join requests have been received within the reception period on the basis of the join request information stored in the storage section.

Moreover, in another aspect of the present invention, there is provided a connection setup method for use in a wireless network, that includes at least: receiving a predetermined trigger; receiving a join request to the wireless network by wireless communication from an external terminal which doesn't join the wireless network of a wireless communication terminal; storing join request information regarding the join request received by a trigger reception section from the external terminal within a reception period corresponding to one trigger; and performing connection setup to make each of a plurality of external terminals from which join requests have been received within the reception period join the wireless network on the basis of the join request information stored in a storage section.

BRIEF DESCRIPTION OF THE DRAWINGS

The above features and advantages of the present invention will be more apparent from the following detailed description of certain preferred embodiments taken in conjunction with the accompanying drawings, in which:

FIG. 17 is a flowchart showing a procedure of an operation (a join waiting operation in the fourth operation example) of the digital still camera according to an embodiment of the present invention;

DETAILED DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Hereinafter, the embodiments of the present invention will be described with reference to the drawings.

In this embodiment, a description is given using a digital still camera as an example of a wireless communication terminal. Without limitation to this, a device capable of being connected to a wireless network such as a PC, a portable phone, a PDA, an optical disk player or recorder, an HDD recorder, a TV, a gaming machine, a video camera, or the like is available as the wireless communication terminal.

Figure 1:
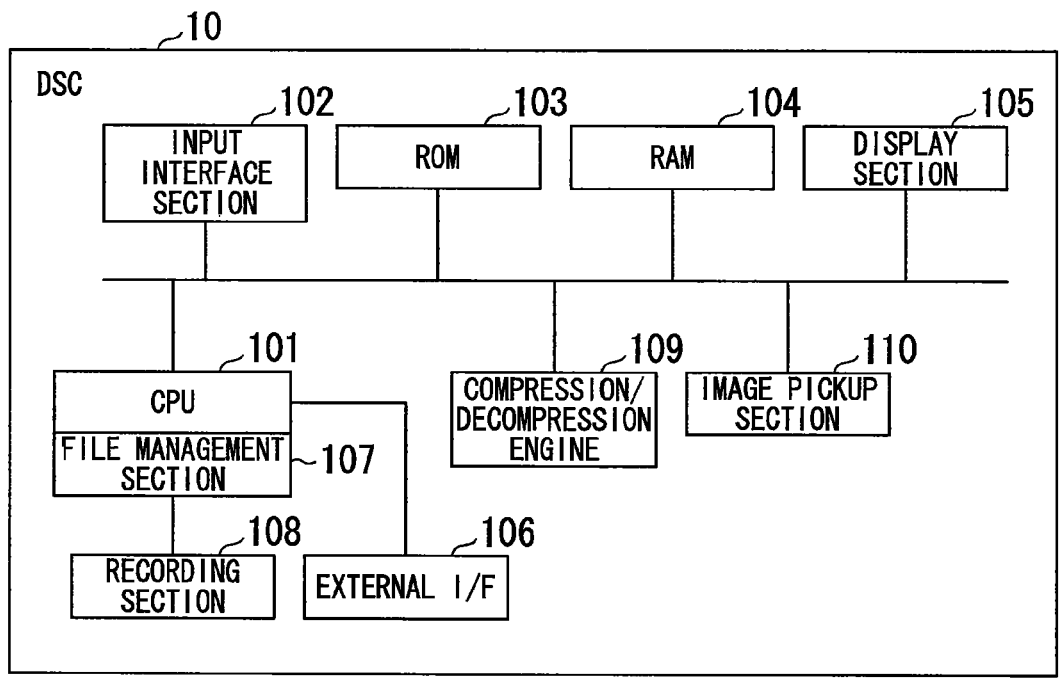
FIG. 1 is a block diagram showing a configuration of a digital still camera according to an embodiment of the present invention.

FIG. 1 shows a configuration of a digital still camera (hereinafter, abbreviated as DSC) according to this embodiment. As shown in FIG. 1, a DSC 10 includes a CPU 101, an input interface section 102, a ROM 103, a RAM 104, a display section 105, an external I/F (external interface) 106, a file management section 107, a recording section 108, a compression/decompression engine 109, and an image pickup section 110.

The CPU 101 performs various control operations using the RAM 104 in a work area according to a control program stored in the ROM 103. The CPU 101 is connected to a wireless network through the external I/F 106 by a network protocol, thereby communicating with an external wireless communication terminal. Data to be transmitted and received upon communication with the external wireless communication terminal is stored in the RAM 104.

The input interface section 102 is an operation input section such as a switch, a button, a key, a dial, or the like for allowing a user to perform an operation input to the DSC 10. The input interface section 102 may be a touch panel or the like superposed on the display section 105. The display section 105 is able to display an image, an operation menu, or the like. According to an instruction from the CPU 101, the file management section 107 manages a file to be recorded in the recording section 108.

The recording section 108 may be a non-volatile recording medium such as a semiconductor memory, a magnetic memory, a magnetic disk, an optical disk, a magneto-optical disk, or the like, a non-volatile recording medium capable of recording information without limitation thereto, or a combination of the above-described recording media. The recording section 108 does not need to be configured from only a single recording medium, and the recording section 108 may be configured from a plurality of recording media.

The compression/decompression engine 109 compresses and decompresses an image. The image pickup section 110 generates image pickup data by picking up an image of an object.

In the DSC 10 of this configuration, the CPU 101 receives image pickup data from the image pickup section 110 according to an instruction input to the input interface section 102 upon photography. The CPU 101 displays an image based on the image pickup data on the display section 105 and stores the image pickup data in the RAM 104. Then, when the CPU 101 makes a compression instruction to the compression/decompression engine 109, the compression/decompression engine 109 compresses the image pickup data within the RAM 104 into an image of a format designated by the CPU 101. According to an instruction from the CPU 101, the compressed image is recorded in the recording section 108 through the file management section 107.

When reproducing the image recording in the recording section 108 as described above, the image within the recording section 108 is first read through the file management section 107 according to an instruction from the CPU 101 and then compressed according to the recorded format by the compression/decompression engine 109. The decompressed image is displayed on the display section 105. In a state in which a setting screen for performing setting related to the DSC 10 and an image upon image pickup or playback is displayed on the display section 105, the user is able to perform the setting of the DSC 10 using the input interface section 102.

Figure 2:
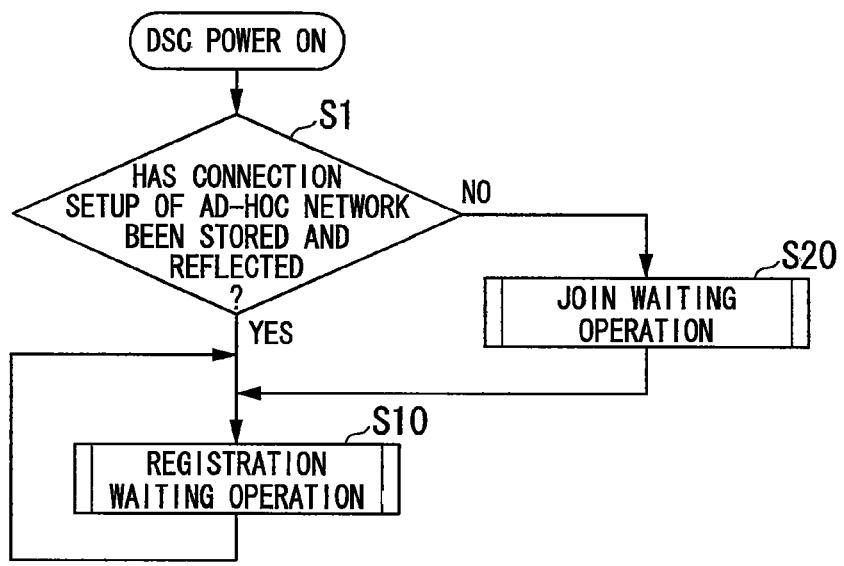
FIG. 2 is a flowchart showing a procedure of an operation of the digital still camera according to an embodiment of the present invention.

Next, the operation of the DSC 10 according to this embodiment will be described. FIG. 2 shows a procedure of the operation of the DSC 10. When the DSC 10 is powered on, the CPU 101 determines whether or not the connection setup of an ad-hoc network has been stored in the RAM 104 and the connection setup has been reflected in the external I/F 106 (S1).

When the connection setup of the ad-hoc network has been stored in the RAM 104 and the connection setup has been reflected in the external I/F 106, the CPU 101 performs a registration waiting operation (S10). On the other hand, when the connection setup of the ad-hoc network has not been stored in the RAM 104 or when the connection setup has not been reflected in the external I/F 106, the CPU 101 performs a join waiting operation (S20).

Hereinafter, the registration waiting operation and the join waiting operation will be described in detail using first to seventh operation examples. Hereinafter, a terminal for receiving a join request from another terminal and performing registration in an ad-hoc network is assumed to be a registration terminal (registrar), and a terminal for sending a join request for the ad-hoc network to another terminal is assumed to be a join terminal (enrollee).

First Operation Example

Figure 3:
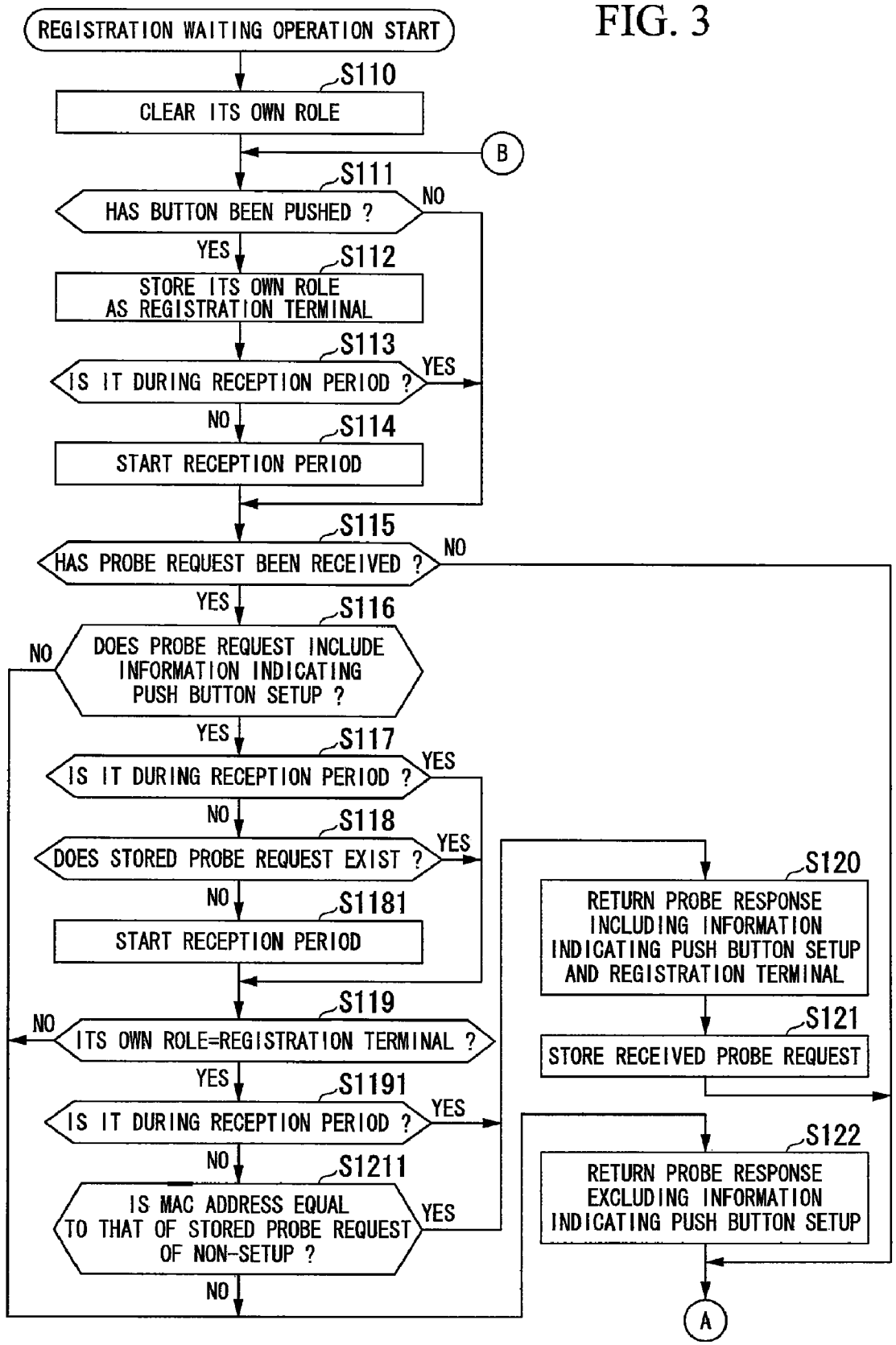
FIG. 3 is a flowchart showing a procedure of an operation (a registration waiting operation in a first operation example) of the digital still camera according to an embodiment of the present invention.
Figure 4:
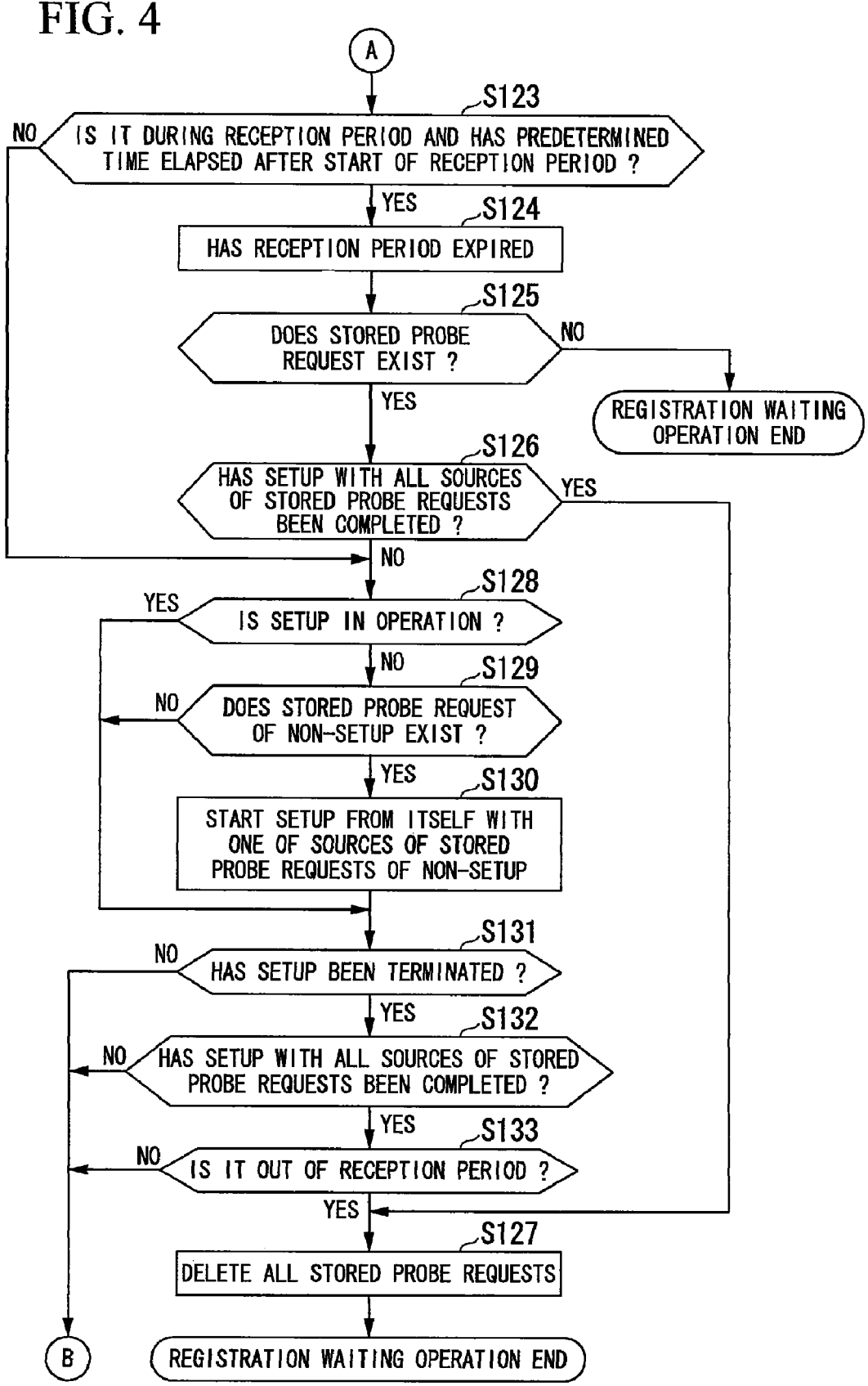
FIG. 4 is a flowchart showing a procedure of an operation (a registration waiting operation in the first operation example) of the digital still camera according to an embodiment of the present invention.

First, the first operation example will be described. FIGS. 3 to 4 show a procedure of the registration waiting operation in the first operation example. To clear previous setup information, the CPU 101 clears its own role stored in the RAM 104 (S110). Subsequently, the CPU 101 determines whether or not a button of its own device for instructing a connection to an ad-hoc network has been pushed (S111). The instruction of the connection to the ad-hoc network is possible not only by pushing a physical button mounted on a device, but also by selecting and deciding a menu or button displayed on an LCD.

When the button has not been pushed, the process proceeds to step S115. On the other hand, when the button has been pushed, the CPU 101 stores its own role as a registration terminal (registrar) in the RAM 104 (S112). Subsequently, the CPU 101 determines whether or not it is during a reception period (S113). When it is during the reception period, the process proceeds to S115. On the other hand, when it is not during the reception period, the CPU 101 starts the reception period (S114). Subsequently, the process proceeds to S115.

The reception period is a period in which the join from a terminal desiring to join the ad-hoc network is accepted. In this embodiment, since a registration terminal does not unlimitedly accept a join request for the ad-hoc network, only join terminals desiring within the reception period to join the ad-hoc network are able to perform the setup.

When the process has proceeded to S115, the CPU 101 determines whether or not a probe request as the join request is received from another device (S115). A conventional probe request includes a setup start method (a push button method, a PIN code input method, or the like), a UUID (Universally Unique Identifier) of a source terminal, and the like as well as a MAC address of the source terminal. A join terminal with which the connection setup of the ad-hoc network is not made is unable to receive the probe request, but a registration terminal with which the connection setup of the ad-hoc network is made is able to receive the probe request.

When the probe request is not received from another device, the process proceeds to S123. On the other hand, when the probe request is received from another device, the CPU 101 determines whether or not information indicating push button setup (hereinafter, abbreviated as PBC information) is included in the probe request (S116).

When the PBC information is not included in the probe request, the CPU 101 transmits a probe response excluding PBC information to the source terminal of the probe request through the external I/F 106 (S122). Subsequently, the process proceeds to S123. On the other hand, when the PBC information is included in the probe request, the CPU 101 determines whether or not it is during the reception period (S117).

During the reception period, the process proceeds to S119. On the other hand, when it is not during the reception period, the CPU 101 determines whether or not a probe request stored in the RAM 104 exists (S118). When a probe request exists, the process proceeds to S119. On the other hand, when a probe request does not exist, the CPU 101 starts the reception period (S1181). That is, the reception period is started when its own button has been pushed or when a probe request with PBC information has been received from another device. After S1181, the process proceeds to S119.

When the process has proceeded to S119, the CPU 101 determines whether or not its own role is to be the registration terminal (S119). When its own role is not to be the registration terminal, the process proceeds to S122. On the other hand, when its own role is to be the registration terminal, the CPU 101 determines whether or not it is during the reception period (S1191).

When it is during the reception period, the CPU 101 transmits a probe response including PBC information and information indicating that its own role is the registration terminal to the source terminal of the probe request through the external I/F 106 (S120), and stores the received probe request in the RAM 104 (S121). When the probe request from a device having the same MAC address has been stored, it is not necessary to additionally store the probe request. After S121, the process proceeds to S123.

On the other hand, when it is not during the reception period, the CPU 101 determines whether or not a MAC address of a source terminal with which the setup has not been made among probe requests stored in the RAM 104 is the same as a MAC address of the source terminal of the received probe request (S1211). When the two MAC addresses are the same, the process proceeds to S120. On the other hand, when the two MAC addresses are different, the process proceeds to S122. It is determined whether or not probe requests are the same using MAC addresses, but information to be used for the determination is not limited to the MAC address. For example, any information capable of uniquely identifying a source terminal like a UUID may be used. In the descriptions of this operation example and other operation examples, the same is true for other sections which perform the determination using a MAC address.

When the process has proceeded to S123, the CPU 101 determines whether or not it is during the reception period and a predetermined time has elapsed after the start of the reception period (S123). When it is not during the reception period or when the predetermined time has not elapsed after the start of the reception period, the process proceeds to S128. On the other hand, when it is during the reception period and the predetermined time has elapsed after the start of the reception period, the CPU 101 terminates the reception period (S124). In the description of this embodiment, "predetermined times" are used in a plurality of parts, but "predetermined times" may not be the same time.

Subsequently, the CPU 101 determines whether or not the probe request stored in the RAM 104 exists (S125). When the probe request does not exist, the CPU 101 terminates the registration waiting operation. On the other hand, when the probe request exists, the CPU 101 determines whether or not the setup with all the source terminals of the stored probe requests has been completed (S126).

When the setup with one or more source terminals of the probe requests has not been completed, the process proceeds to S128. On the other hand, when the setup with all the source terminals of the probe requests has been completed, the CPU 101 deletes all the stored probe requests from the RAM 104 (S127) and terminates the registration waiting operation.

When the process has proceeded to S128, the CPU 101 determines whether or not the setup is in operation at present. When the setup is in operation at present, the process proceeds to S131. On the other hand, when the setup is not in operation, the CPU 101 determines whether or not a stored probe request for which the setup with a source terminal is not made exists in the RAM 104 (S129).

When a probe request for which the setup with a source terminal is not made does not exist, the process proceeds to S131. On the other hand, when a probe request for which the setup with a source terminal is not made exists, the CPU 101 starts the setup from itself with one source terminal on the basis of probe request information from the source terminal with which the setup is not made among the probe requests stored in the RAM 104 (S130). As a method of selecting a source terminal with which the setup is made, for example, the oldest stored probe request may be selected, but various selection methods are available without limitation thereto. After S130, the process proceeds to S131.

When the process has proceeded to S131, the CPU 101 determines whether or not the setup is terminated (S131). When the setup is not terminated, the process returns to S111. On the other hand, when the setup is terminated, the CPU 101 determines whether or not the setup with all source terminals of the probe requests stored in the RAM 104 has been completed (S132).

When the setup with one or more source terminals of the probe requests stored in the RAM 104 has not been completed, the process returns to S111. On the other hand, when the setup with all source terminals of the probe requests stored in the RAM 104 has been completed, the CPU 101 determines whether or not the present time is out of the reception period (S133). When the present time is out of the reception period, the process proceeds to S127. On the other hand, when the present time is not out of the reception period, the process returns to S111.

In the case of the above-described registration waiting operation, when a probe request has not been transmitted from any terminal during the reception period, an ad-hoc network is not formed between the registration terminal and another terminal. Even when the reception period has expired in the case where a probe request has not been transmitted from any terminal during the reception period, an ad-hoc network may be formed with only a terminal transmitting a first probe request within a predetermined time thereafter. This is equally applicable to other operation examples to be described later.

Figure 5:
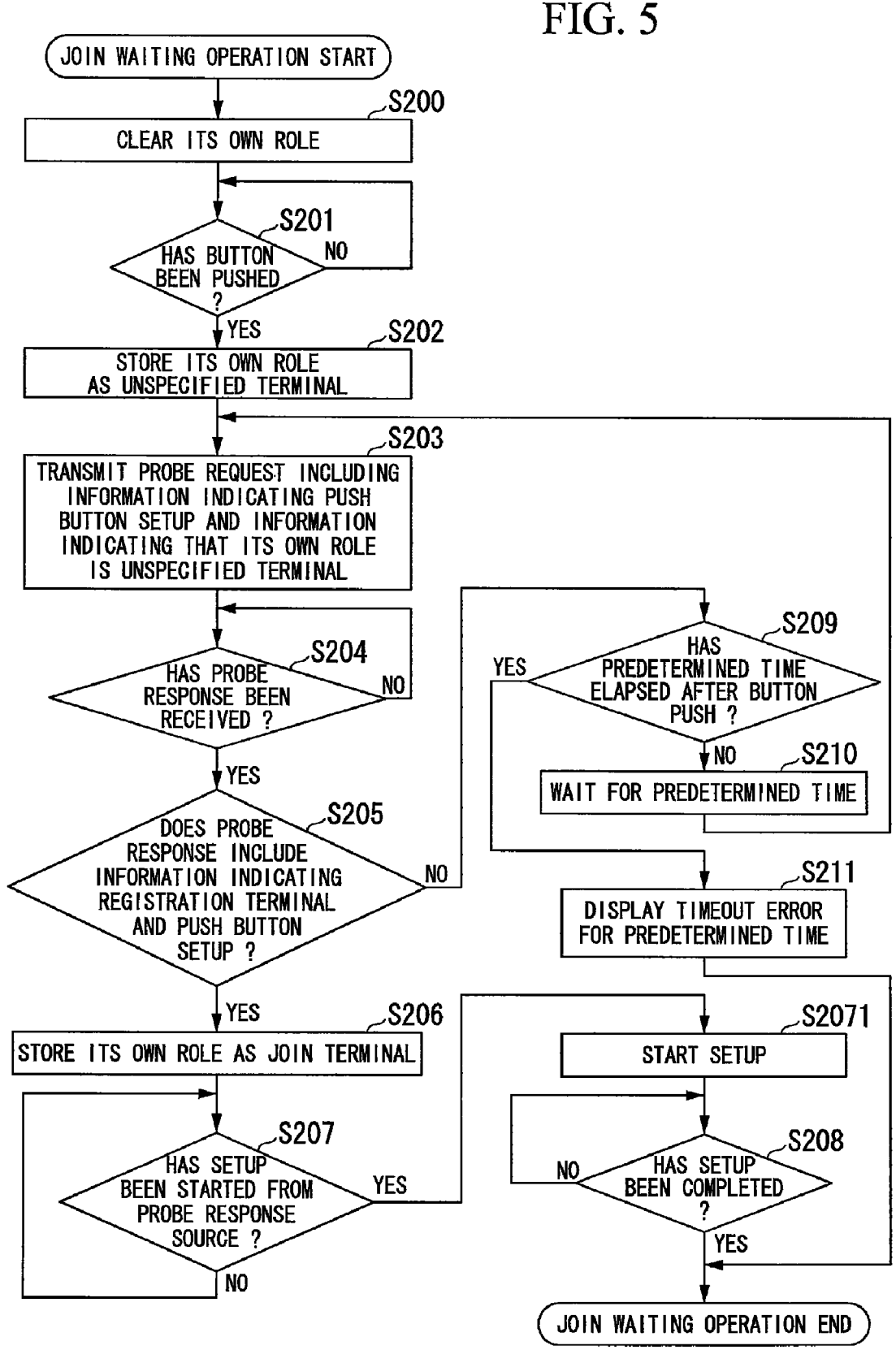
FIG. 5 is a flowchart showing a procedure of an operation (a join waiting operation in the first operation example) of the digital still camera according to an embodiment of the present invention.

FIG. 5 shows a procedure of a join waiting operation in the first operation example. To clear previous setup information, the CPU 101 clears its own role stored in the RAM 104 (S200). Subsequently, the CPU 101 determines whether or not a button of its own device for instructing a connection to an ad-hoc network has been pushed (S201). As described above, the instruction of the connection to the ad-hoc network is possible not only by pushing a physical button mounted on a device, but also by selecting and deciding a menu or button displayed on an LCD.

When the button has not been pushed, the determination of S201 is repeated. On the other hand, when the button has been pushed, the CPU 101 stores its own role as an unspecified terminal (E/R) in the RAM 104 (S202), and transmits a probe request including PBC information and information indicating that its own role is an unspecified terminal through the external I/F 106 (S203). Subsequently, the CPU 101 determines whether or not a probe response has been received (S204).

When the probe response has not been received, the determination of S204 is repeated. On the other hand, when the probe response has been received, the CPU 101 determines whether or not the probe response includes PBC information and information indicating a registration terminal (S205). When the probe response includes the two information elements, the process proceeds to S206. On the other hand, when the probe response does not include at least one of the two information elements, the process proceeds to S209.

When the process has proceeded to S206, the CPU 101 stores its own role as a join terminal (enrollee) in the RAM 104 (S206), and determines whether or not the setup has been started from a source terminal of the probe response (S207). When the setup has not been started, the determination of S207 is repeated. On the other hand, when the setup has been started, the CPU 101 starts its own setup in accordance with the start of the setup by the source terminal of the probe response (S2071).

Subsequently, the CPU 101 determines whether or not the setup has been completed (S208). When the setup has not been completed, the determination of S208 is repeated. On the other hand, when the setup has been completed, the CPU 101 terminates the join waiting operation.

On the other hand, when the process has proceeded to S209, the CPU 101 determines whether or not a predetermined time has elapsed after pushing of the button (S209). When the predetermined time has elapsed, the CPU 101 displays a timeout error on the display section 105 for predetermined-time (S211) and terminates the join waiting operation. On the other hand, when the predetermined time has not elapsed, the CPU 101 waits for the predetermined time to elapse after the timing (S210). Subsequently, the process returns to S203.

Figure 6:
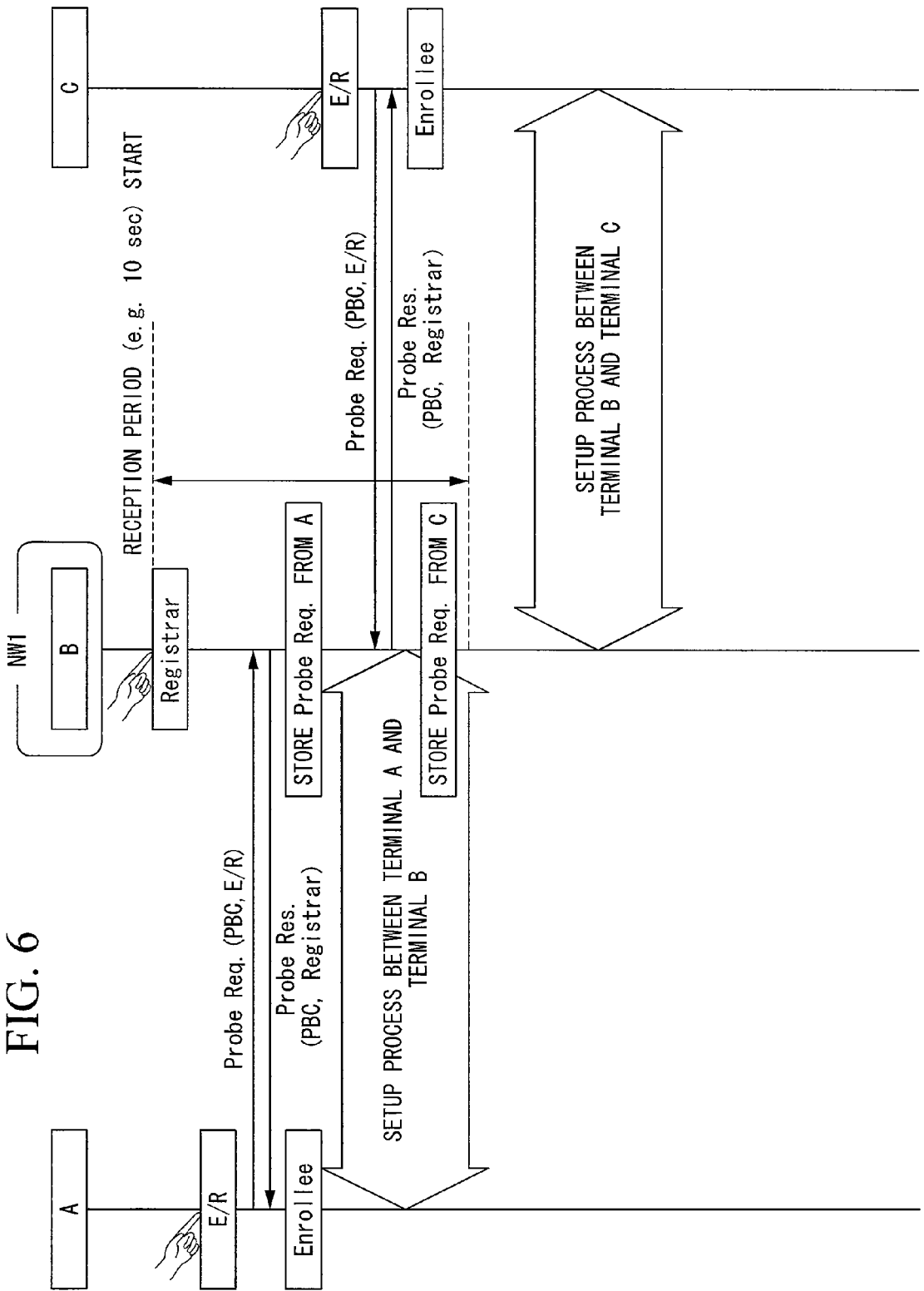
FIG. 6 is a sequence diagram showing a procedure of communication (communication in the first operation example) performed between digital still cameras according to an embodiment of the present invention.

FIG. 6 shows an operation example by the registration waiting operation and the join waiting operation described above. In the example shown in FIG. 6, terminals A, B, and C having the configuration of the DSC 10 exist. When power is input, the terminal B starts the registration waiting operation since its own device has been stored the connection setup of an ad-hoc network NW1 and the connection setup has been reflected (corresponding to S1 and S10). In the registration waiting operation, the terminal B clears its own role, and starts the reception period and stores its own role as a registration terminal (registrar) when the button is pushed (corresponding to S110 to S114). In this operation example, a predetermined period until the reception period expires is set to 10 sec. Then, the terminal B waits for a probe request to be received (corresponding to S115).

On the other hand, when power is input, the terminal A starts the join waiting operation since its own device does not store the connection setup of the ad-hoc network (corresponding to S1 and S20). In the join waiting operation, the terminal A clears its own role, stores its own role as an unspecified terminal (E/R) when the button is pushed, and transmits a probe request including information indicating push button setup (PBC information) and information indicating that its own role is an unspecified terminal (hereinafter, abbreviated as E/R information) (corresponding to S200 to S203).

Since the terminal B belongs to the ad-hoc network NW1, it receives the probe request (corresponding to S115). The probe request transmitted from the terminal A includes the PBC information and the E/R information (corresponding to S116). At this time, the terminal B is in the reception period and stores its own role as the registration terminal (corresponding to S117, S119, and S1191). The terminal B transmits a probe response including PBC information and information indicating that its own role is the registration terminal (hereinafter, abbreviated as registrar information) to the terminal A (corresponding to S120) and stores the probe request transmitted from the terminal A (corresponding to S121).

When the probe response is received from the terminal B (corresponding to S204), the terminal A stores its own role as the join terminal (enrollee) since the probe response includes the PBC information and the registrar information (corresponding to S205 and S206), and waits for the setup to be started from the terminal B (corresponding to S207).

After transmitting the probe response, the reception period is still not completed (corresponding to S123) and the setup is not made for the terminal B (corresponding to S128). Since the probe request from terminal A has been stored and the setup with the terminal A has not been made (corresponding to S129), the setup with the terminal A is started from the terminal B (corresponding to S130).

When the terminal A starts the setup (corresponding to S2071) and completes the setup (corresponding to S208) after the setup is started from the terminal B (corresponding to S207), the join waiting operation is terminated. On the other hand, while the setup is made, the terminal B waits for the probe request to be received, waits for the reception period to be completed, and waits for the setup to be completed (corresponding to S115, S123, and S131).

When power is input and the button is pushed, the terminal C stores its own device as an unspecified terminal and waits for a probe response to be received by transmitting a probe request including PBC information and E/R information as in the terminal A (corresponding S1, S20, and S200 to S203).

When the terminal B receives the probe request (corresponding to S115), the terminal B returns a probe response including PBC information and registrar information to the terminal C (corresponding to S120) and stores the probe request transmitted from the terminal C (corresponding to S121) since the probe request includes PBC information (corresponding to S116) and it is during the reception period and its own device is the registration terminal (corresponding to S117, S119, and S1191).

When the probe response is received, the terminal C stores its own role as a join terminal and waits for the setup to be started from the terminal B (corresponding to S206 and S207) since the probe response includes PBC information and registrar information (corresponding to S205). Then, when the reception period of 10 sec has elapsed, the terminal B terminates the reception period (corresponding to S123 and S124). At this time, the terminal B waits for the setup with the terminal A to be terminated (corresponding to S131) since the terminal B stores the probe requests from the terminals A and C (corresponding to S125) but the setup with any one of the terminals A and C is not terminated (corresponding to S126).

At the point in time when the setup between the terminal A and the terminal B has been completed (corresponding to S131), the setup between the terminal B and the terminal C is not completed (corresponding to S132). Further, the setup between the terminal B and the terminal C is not made (corresponding to S128) and the setup with the terminal C among source terminals of the stored probe requests is not made (corresponding to S129). Thus, the terminal B starts the setup from itself with the terminal C (corresponding to S130).

When the setup is started from the terminal B (corresponding to S207), the terminal C starts the setup (corresponding to S2071), waits for the setup to be completed (corresponding to S208), and terminates the join waiting operation after completing the setup.

When the setup with the terminal C has been completed (corresponding to S131), the terminal B deletes all the stored probe requests from the terminals A and C in the RAM 104 (corresponding to S127) and terminates the registration waiting operation since the setup with any one of the terminals A and C as the sources of the stored probe requests has been completed (corresponding to S132) and the reception period has expired (corresponding to S133).

When the user inputs a trigger to join an ad-hoc network for each of the terminals A, B, and C as described above, the setup between the terminal A and the terminal B and the setup between the terminal B and the terminal C are executed. Accordingly, the terminals A, B, and C are able to collectively perform the connection setup for joining the ad-hoc network. Since the process related to the setup is heavy, another setup operation is started after one setup operation is completed without performing two setup operations in parallel in this embodiment.

Second Operation Example

Figure 7:
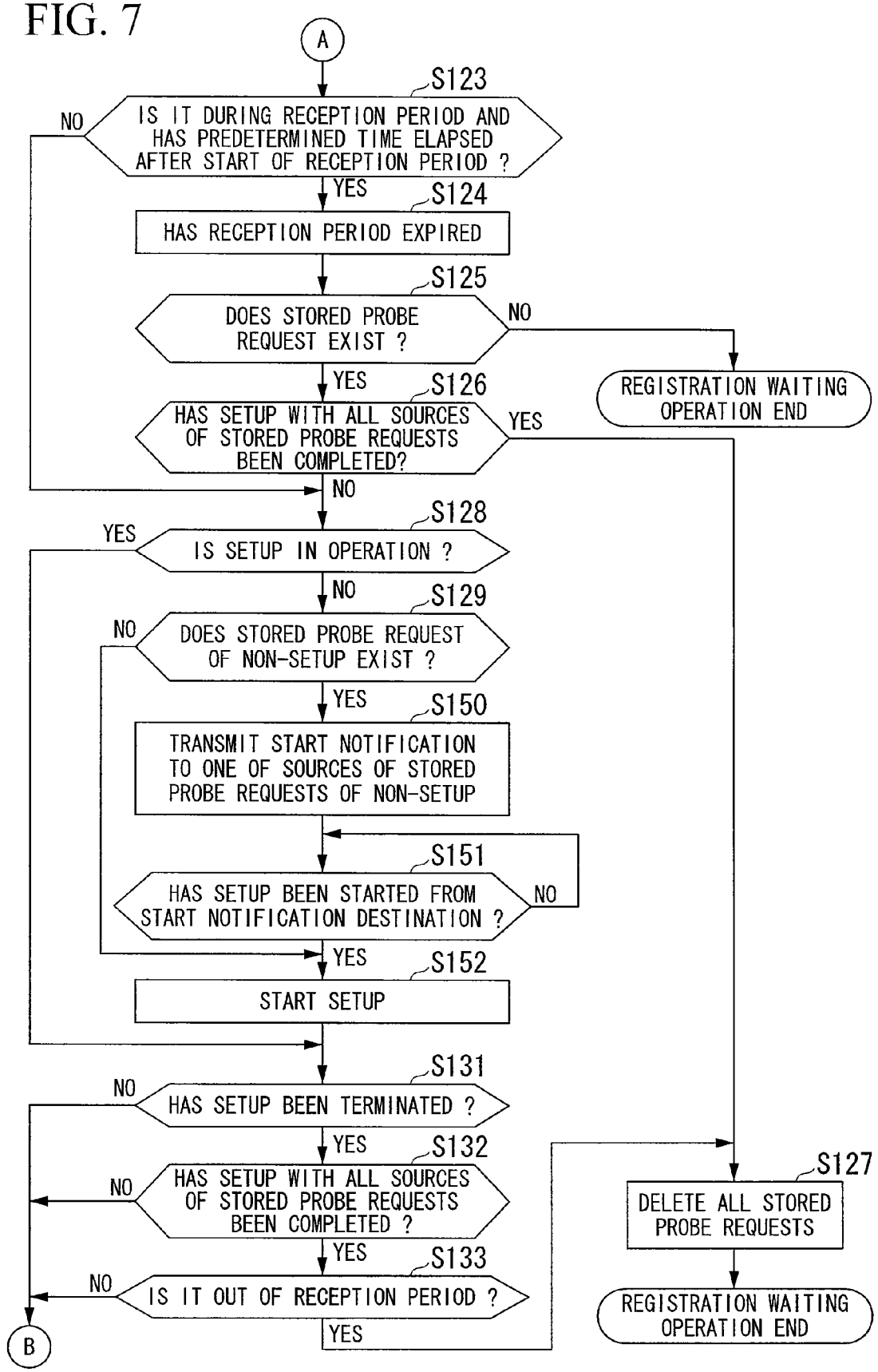
FIG. 7 is a flowchart showing a procedure of an operation (a registration waiting operation in a second operation example) of the digital still camera according to an embodiment of the present invention.

Next, the second operation example will be described. FIG. 7 shows a procedure of a registration waiting operation in the second operation example. The second operation example has the same procedure as shown in FIG. 3. A difference between the procedure shown in FIG. 4 and the procedure shown in FIG. 7 is that a terminal independently starts the setup in the procedure shown in FIG. 4, but a terminal transmits a start notification and waits for a join terminal to start the setup when a state in which the setup is able to be started has been reached in the procedure shown in FIG. 7. Hereinafter, only parts different from those of the procedure shown in FIG. 4 will be described.

When a probe request for which the setup with a source terminal is not made exists among stored probe requests and a terminal is not executing the setup in S128 and S129, the CPU 101 transmits a start notification to one of source terminals of the probe requests for which the setup is not made through the external I/F 106 (S150). As a method of selecting a source terminal of a probe request, for example, a source terminal of the oldest stored probe request may be selected, but various selection methods are available without limitation thereto.

After transmitting the start notification, the CPU 101 determines whether or not the setup has been started from a destination terminal of the start notification (S151). When the setup has not been started, the determination of S151 is repeated. On the other hand, when the setup has been started, the CPU 101 starts its own setup in accordance with the start of the setup by the destination terminal of the start notification (S152). Subsequently, the process proceeds to S131.

Figure 8:
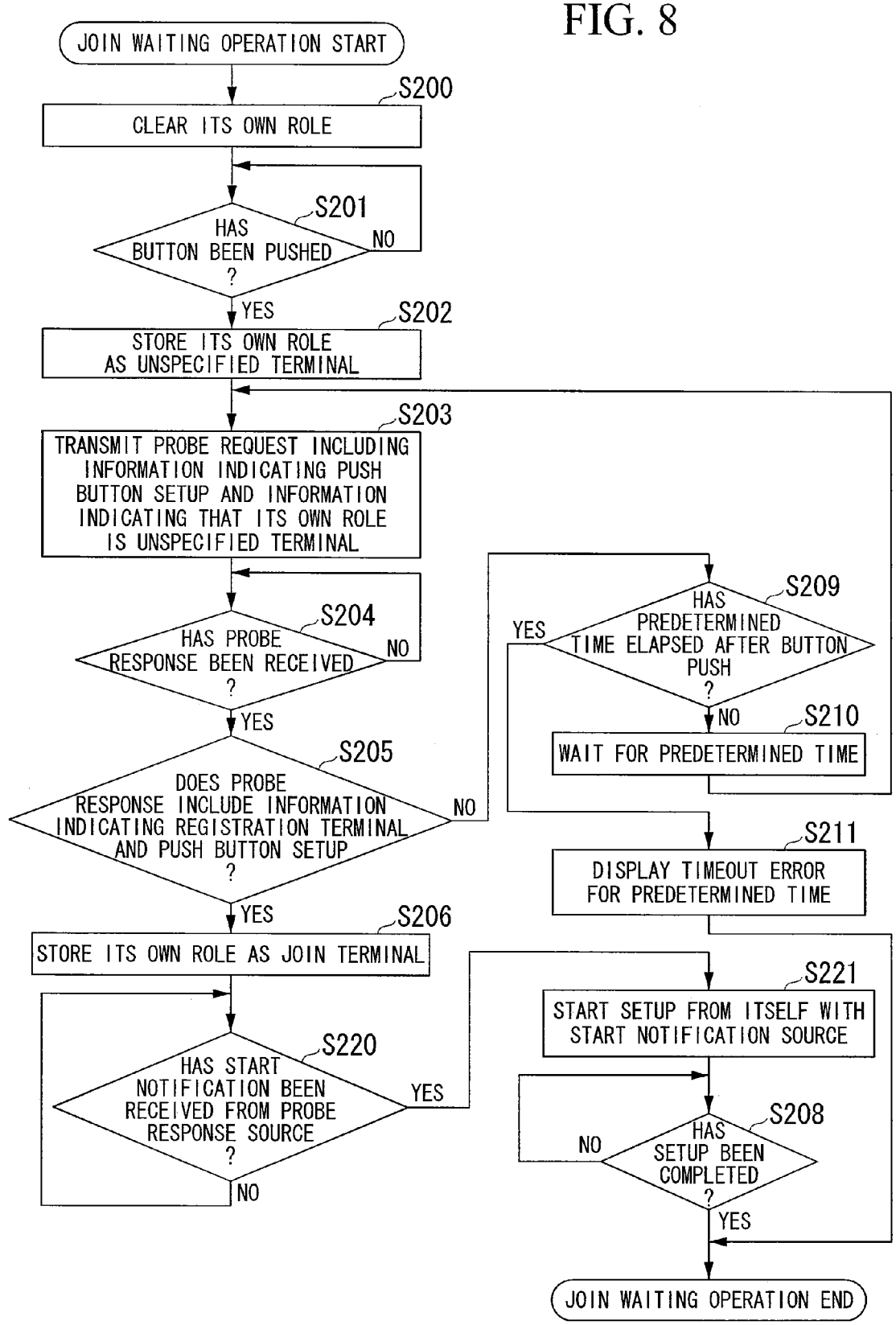
FIG. 8 is a flowchart showing a procedure of an operation (a join waiting operation in the second operation example) of the digital still camera according to an embodiment of the present invention.

FIG. 8 shows a procedure of a join waiting operation in the second operation example. A difference between the procedure shown in FIG. 5 and the procedure shown in FIG. 8 is that a terminal waits for the setup to be started from a source terminal of a probe response in the procedure shown in FIG. 5, but a terminal waits for a start notification to be received and starts the setup from itself after receiving the start notification in the procedure shown in FIG. 8. Hereinafter, only parts different from those of the procedure shown in FIG. 5 will be described.

In S205 and S206, the CPU 101 stores its own role as a join terminal by receiving a probe response including PBC information and registrar information.

Then, the CPU 101 determines whether or not the start notification has been received from the source terminal of the probe response (S220). When the start notification has not been received, the determination of S220 is repeated. On the other hand, when the start notification has been received, the CPU 101 starts the setup from itself with the source terminal of the start notification (S221). Subsequently, the process proceeds to S208.

Figure 9:
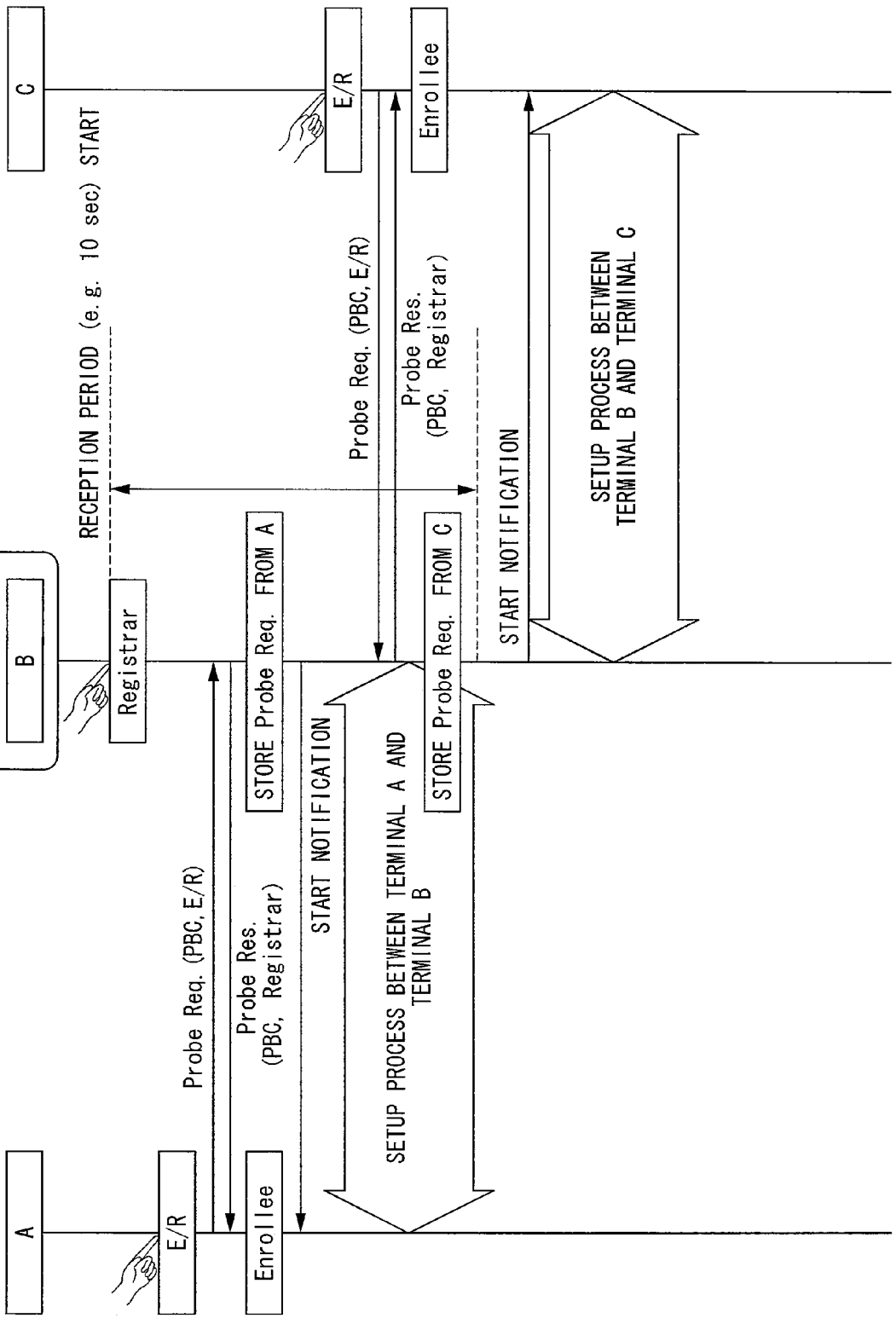
FIG. 9 is a sequence diagram showing a procedure of communication (communication in the second operation example) performed between digital still cameras according to an embodiment of the present invention.

FIG. 9 shows an operation example by the registration waiting operation and the join waiting operation described above. In the example shown in FIG. 9, terminals A, B, and C having the configuration of the DSC 10 exist. Hereinafter, only parts different from those of the example shown in FIG. 6 will be described.

Since the setup is not in operation (corresponding to S128) and the setup with the terminal A is not made (corresponding to S129) after the terminal B returns a probe response to the terminal A and stores a probe request transmitted from the terminal A (corresponding to S120 and S121), the terminal B transmits the start notification to the terminal A (corresponding to S150) and waits for the setup to be started from the terminal A (corresponding to S151).

After the terminal A stores its own role as the join terminal by receiving the probe response including information indicating push button setup (PBC information) and information indicating that its own role is the registration terminal (registrar information) from the terminal B, the terminal A waits for the start notification to be received from the terminal B (corresponding to S205, S206, and S220). Upon receipt of the start notification, the terminal A starts the setup from itself with the terminal B (corresponding to S221), waits for the setup to be completed (corresponding to S208), and terminates the join waiting operation.

When the setup is started from the terminal A (corresponding to S151), the terminal B starts the setup (corresponding to S152) and waits for the setup to be completed (corresponding to S131). At the point in time when the terminal B has returned the probe response to the terminal C and stored the probe request transmitted from the terminal C (corresponding to S120 and S121), the setup with the terminal A is in operation (corresponding to S128). At the point in time when the setup with the terminal A has been completed (corresponding to S131), the setup with the terminal C is not made (corresponding to S132). At this time, since other setup is not being executed (corresponding to S128) and the setup with the terminal C is not made (corresponding to S129), the terminal B transmits the start notification to the terminal C (corresponding to S150) and waits for the setup to be started from the terminal C (corresponding to S151).

After the terminal C receives a probe response including PBC information and registrar information from the terminal B and stores its own role as the join terminal, it waits for the start notification to be received from the terminal B (corresponding to S205, S206, and S220). Upon receipt of the start notification, the terminal C starts the setup from itself with the terminal B (corresponding to S221), waits for the setup to be completed (corresponding to S208), and terminates the join waiting operation.

When the setup is started from the terminal C (corresponding to S151), the terminal B starts the setup (corresponding to S152) and waits for the setup to be completed (corresponding to S131). When the setup with the terminal C has been completed (corresponding to S131), the terminal B terminates the registration waiting operation by deleting all the probe requests of the terminals A and C from the RAM 104 (corresponding to S127) since the setup with any one of the terminals A and C as the sources of the stored probe requests has been completed (corresponding to S132) and the reception period expired (corresponding to S133).

As described above, the setup with the terminal B is able to be started from the terminals A and C as the join terminals. Since the setup is able to be started from a join terminal side in a conventional WPS, it is unnecessary to change a procedure of a setup process for the second operation example.

Third Operation Example

Figure 10:
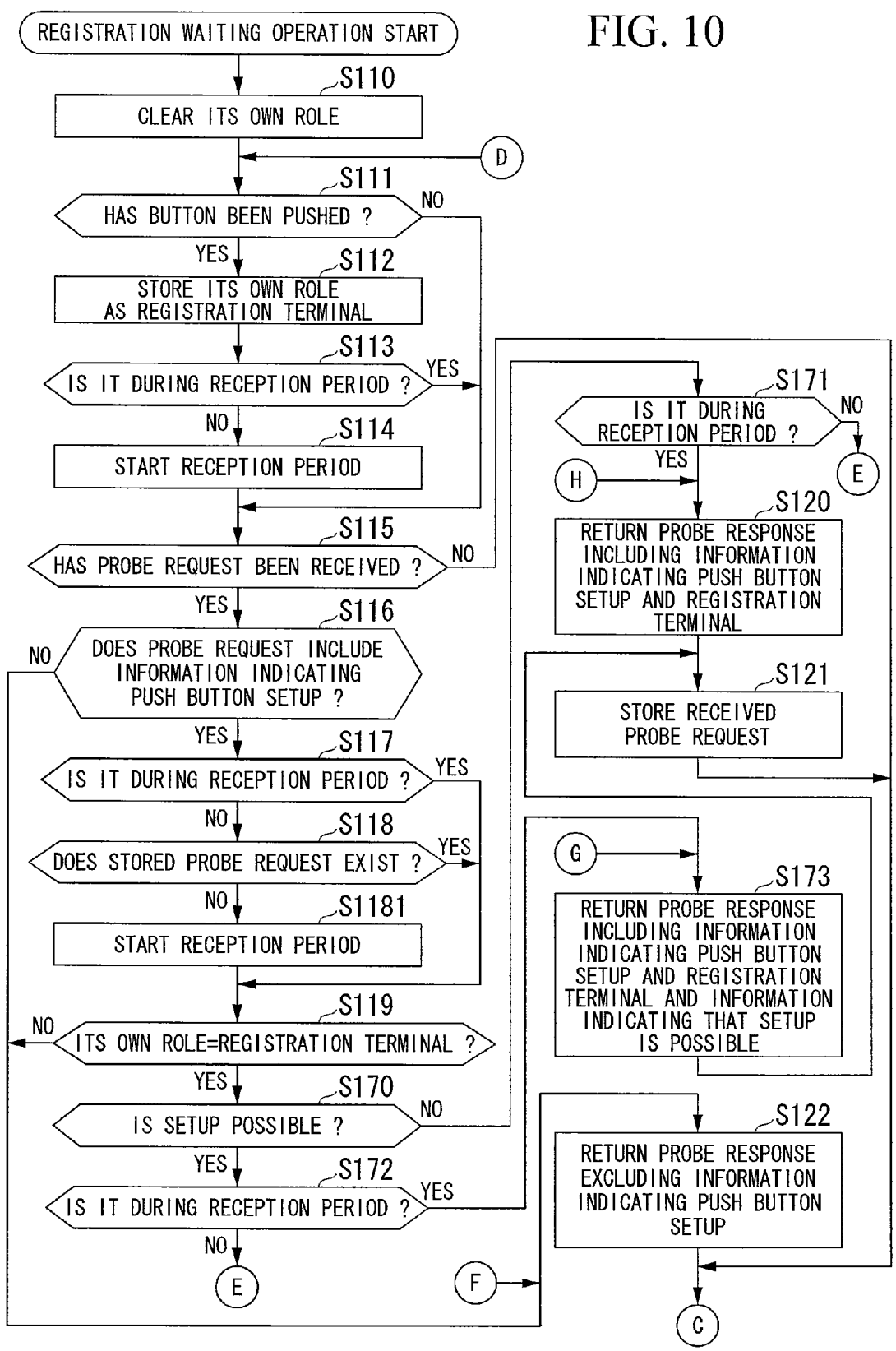
FIG. 10 is a flowchart showing a procedure of an operation (a registration waiting operation in a third operation example) of the digital still camera according to an embodiment of the present invention.
Figure 11:
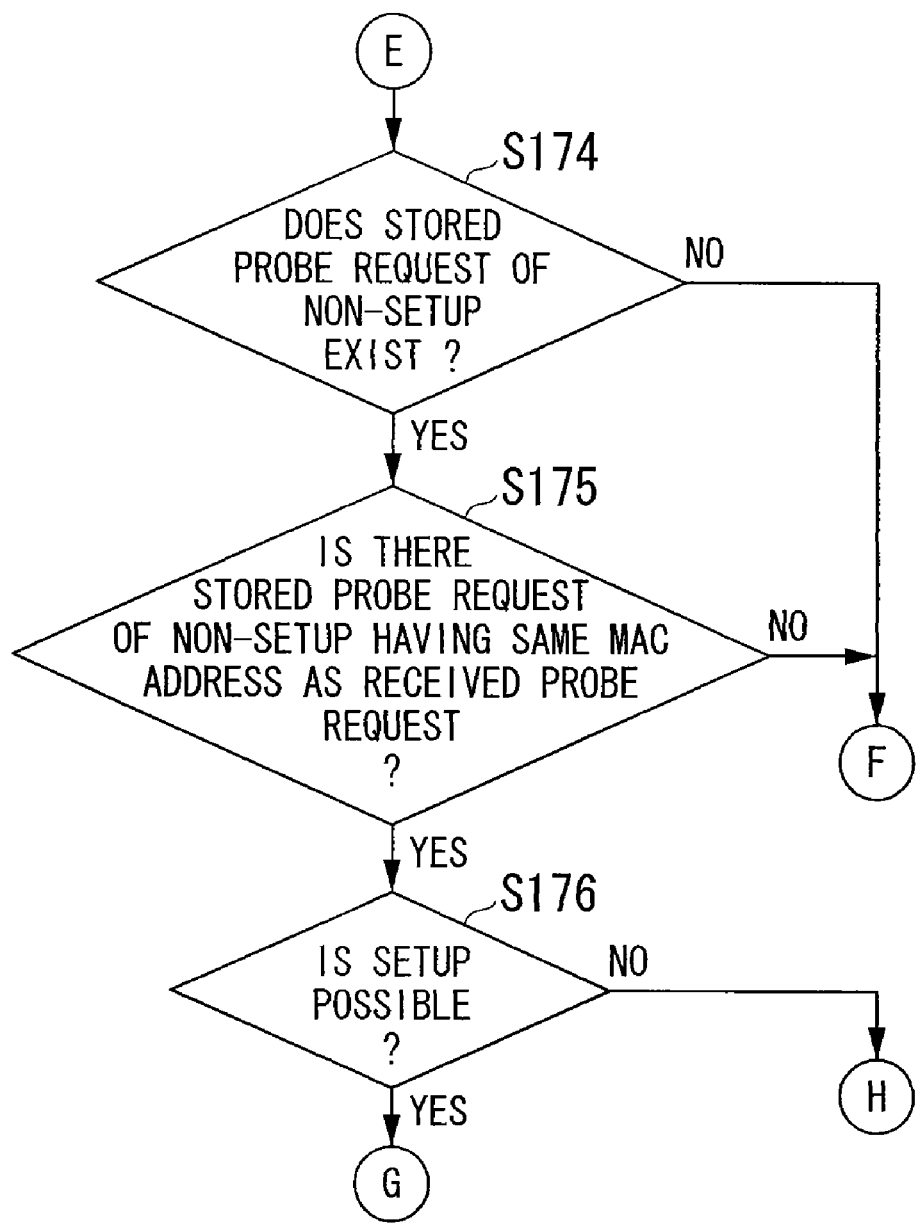
FIG. 11 is a flowchart showing a procedure of an operation (a registration waiting operation in the third operation example) of the digital still camera according to an embodiment of the present invention.
Figure 12:
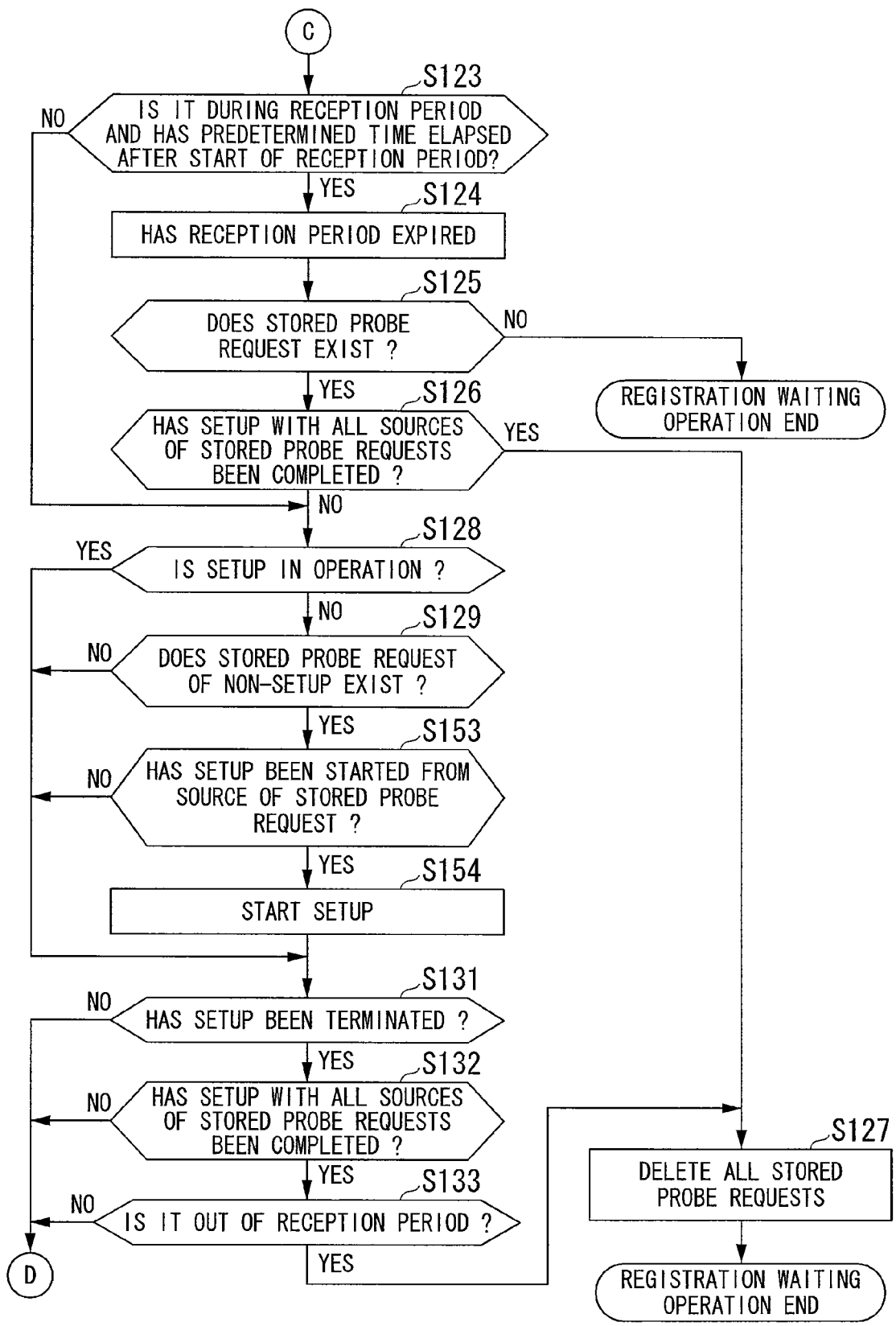
FIG. 12 is a flowchart showing a procedure of an operation (a registration waiting operation in the third operation example) of the digital still camera according to an embodiment of the present invention.

Next, the third operation example will be described. FIGS. 10 to 12 show a procedure of a registration waiting operation in the third operation example. A difference between the procedure shown in FIGS. 3 and 4 and the procedure shown in FIGS. 10 to 12 is that a registration terminal independently starts the setup in the procedure shown in FIGS. 3 and 4, but a registration terminal transmits a probe response including information indicating that the setup is possible in correspondence with a probe request received in a state in which the setup is possible, and waits for the setup to be started from a join terminal in the procedure shown in FIGS. 10 to 12. Hereinafter, only parts different from those of the procedure shown in FIGS. 3 and 4 will be described.

When the received probe request includes PBC information and its own role is the registration terminal in S116 and S119, the CPU 101 determines whether or not its own device is in a state in which the setup is possible (S170). When its own device is not in the state in which the setup is possible due to the reason that its own device is unable to perform a plurality of setup operations in parallel, the process proceeds to S171. On the other hand, when its own device is in the state in which the setup is possible, the process proceeds to S172.

When the process has proceeded to S171, the CPU 101 determines whether or not it is during the reception period (S171). When it is during the reception period, the process proceeds to S120. On the other hand, when it is not during the reception period, the CPU 101 determines whether or not a probe request for which the setup with a source terminal is not made exists in relation to the probe requests stored in the RAM 104 (S174).

When a probe request for which the setup with a source terminal is not made does not exist, the process proceeds to S122. On the other hand, when a probe request for which the setup with a source terminal is not made exists, the CPU 101 determines whether or not a MAC address of a source terminal of a stored probe request among probe requests stored in the RAM 104 is the same as a MAC address of a source terminal of a received probe request (S175).

When the two MAC addresses are different, the process proceeds to S122. On the other hand, when the two MAC addresses are the same, the CPU 101 determines whether or not the setup is possible (S176). When the setup is possible, the process proceeds to S173. When the setup is impossible, the process proceeds to S120.

When the process has proceeded to S172, the CPU 101 determines whether or not it is during the reception period (S172). When it is not during the reception period, the process proceeds to S174. On the other hand, when it is during the reception period, the CPU 101 transmits a probe response including PBC information, information indicating the registration terminal, and information indicating that the setup is possible through the external I/F 106 (S173). Subsequently, the process proceeds to S121.

On the other hand, when a probe request for which the setup with a source terminal is not made exists among stored probe requests and a terminal is not executing the setup in S128 and S129, the CPU 101 determines whether or not the setup has been started from the source terminal of the probe request (S153).

When the setup has been started from the source terminal of the stored probe request, the CPU 101 starts its own setup in accordance with the start of the setup by the source terminal (S154). Subsequently, the process proceeds to S131. On the other hand, when the setup has not been started from the source terminal of the stored probe request, the process proceeds to S131.

Figure 13:
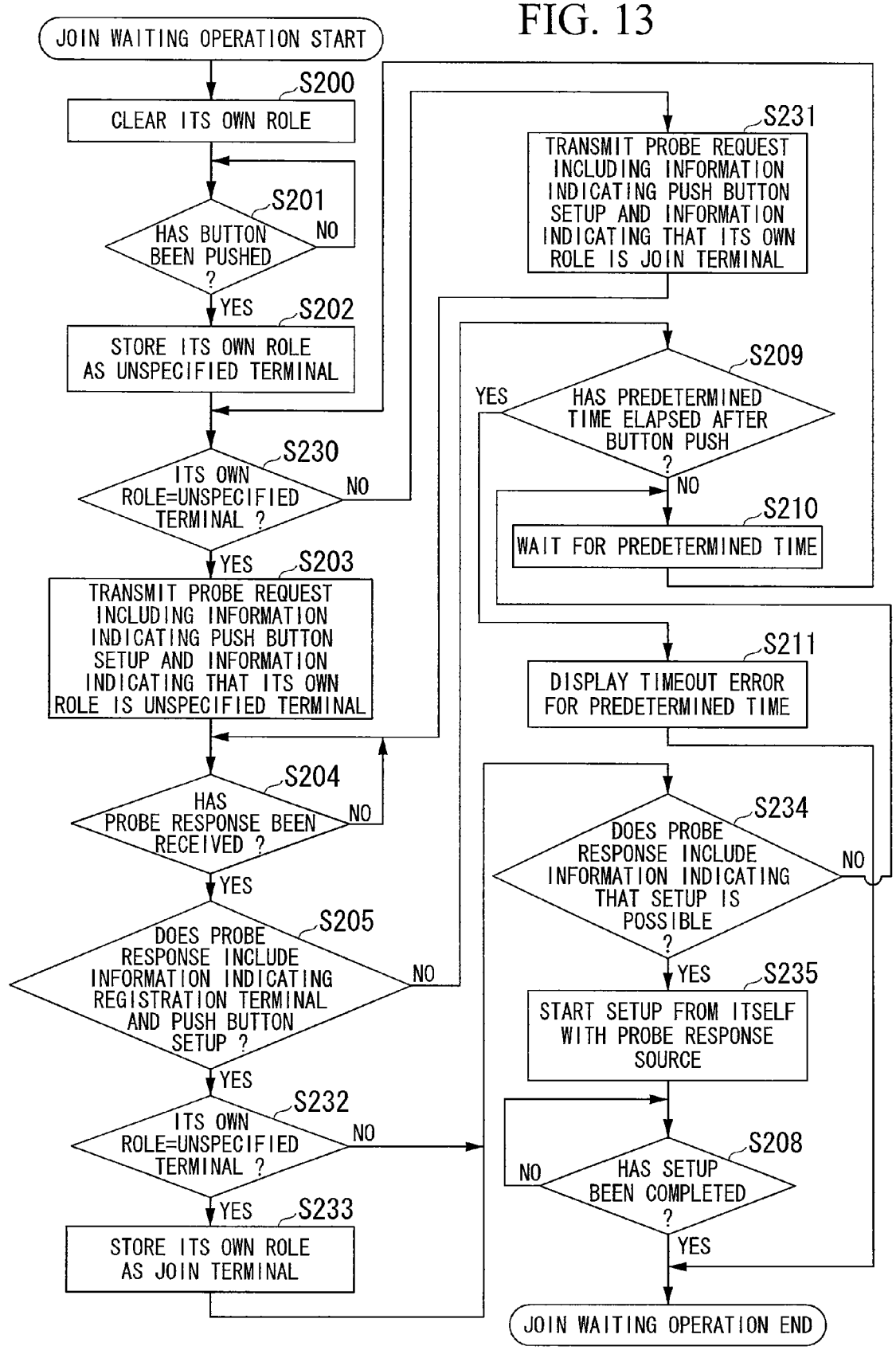
FIG. 13 is a flowchart showing a procedure of an operation (a join waiting operation in the third operation example) of the digital still camera according to an embodiment of the present invention.

FIG. 13 shows a procedure of a join waiting operation in the third operation example. A difference between the procedure shown in FIG. 5 and the procedure shown in FIG. 13 is that a terminal waits for the setup to be started from a source terminal of a probe response in the procedure shown in FIG. 5, but a terminal repeatedly transmits a probe request at every predetermined time as long as information indicating that the setup is possible is not included even when a probe response including PBC information and information indicating the registration terminal is received and a terminal starts the setup from itself when a probe response including information indicating that the setup is possible has been received in the procedure shown in FIG. 13. Hereinafter, only parts different from those of the procedure shown in FIG. 5 will be described.

After the button is pushed and the role as an unspecified terminal is stored in the RAM 104 in S201 and S202, the CPU 101 determines whether or not its own role is the unspecified terminal (S230). When its own role is the unspecified terminal, the process proceeds to S203. On the other hand, when its own role is not the unspecified terminal, the CPU 101 transmits a probe request including PBC information and information indicating that its own role is a join terminal (S231) and waits for a probe response to be received (S204).

When the probe response is received which includes PBC information and information indicating a registration terminal (S205), the CPU 101 determines whether or not its own role is the unspecified terminal (S232). When its own role is not the unspecified terminal, the process proceeds to S234. On the other hand, when its own role is the unspecified terminal, the CPU 101 stores its own role as the join terminal in the RAM 104 (S233). Subsequently, the process proceeds to S234.

When the process has proceeded to S234, the CPU 101 determines whether or not information indicating that the setup is possible is included (S234). When the information indicating that the setup is possible is not included, the process proceeds to S210. On the other hand, when the information indicating that the setup is possible is included, the CPU 101 starts the setup from itself with the source terminal of the probe response (S235) and waits for the setup to be completed (S208).

Figure 14:
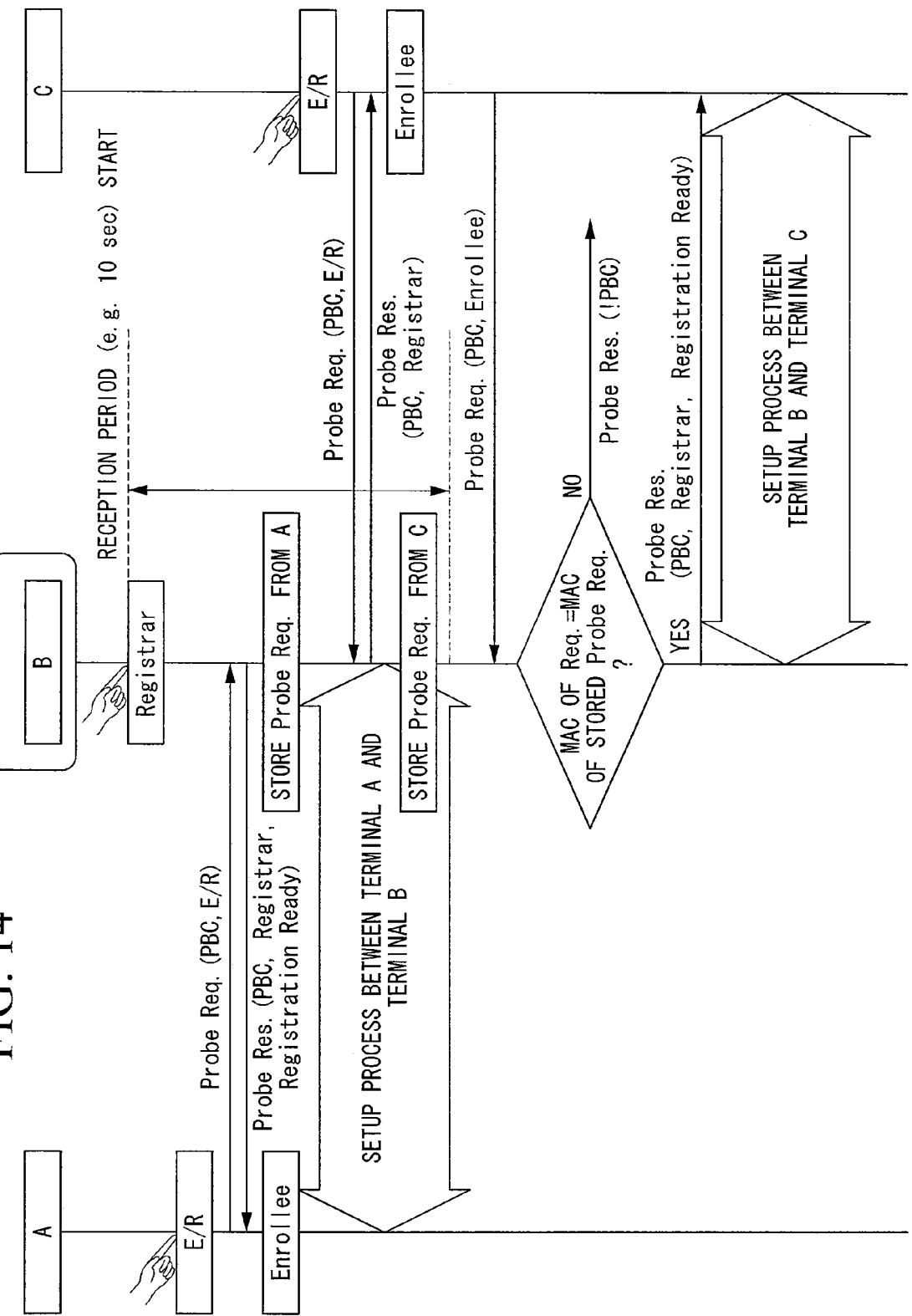
FIG. 14 is a sequence diagram showing a procedure of communication (communication in the third operation example) performed between digital still cameras according to an embodiment of the present invention.

FIG. 14 shows an operation example by the registration waiting operation and the join waiting operation described above. In the example shown in FIG. 14, terminals A, B, and C having the configuration of the DSC 10 exist. Hereinafter, only parts different from those of the example shown in FIG. 6 will be described.

The terminal B receives a probe request including information indicating push button setup (PBC information) from the terminal A and recognizes that its own role is the registration terminal (corresponding to S115, S116, and S119). At this time, the setup is possible since the terminal B does not perform the setup with another terminal (corresponding to S170), and also it is during the reception period (corresponding to S172). Thus, the terminal B returns a probe response including PBC information, information indicating that its own role is the registration terminal (registrar information), and information indicating that the setup is possible (hereinafter, abbreviated as registration ready information) to the terminal A (corresponding to S173) and stores the probe request transmitted from the terminal A (corresponding to S121).

The terminal A stores its own role as the join terminal since the probe response received from the terminal B includes the PBC information, the registrar information, and the registration ready information, and starts the setup from itself with the terminal B (corresponding to S205 and S232 to S235). When the setup is completed (corresponding to S208), the terminal A terminates the join waiting operation.

When the setup is started from the terminal A (corresponding to S153 and S154), the terminal B waits for the setup to be terminated (corresponding to S131). The terminal B receives the probe request including the PBC information from the terminal C, and recognizes that its own role is the registration terminal (corresponding to S115, S116, and S119). However, at this time, the setup is impossible since the setup with the terminal A is in operation, and it is during the reception period (corresponding to S170 and S171). Thus, the terminal B returns the probe response including the PBC information and the registrar information to the terminal C and stores the probe request transmitted from the terminal C (corresponding to S120 and S121). At this time, the setup with the terminal A is in operation (corresponding to S128). Thereafter, the setup with the terminal A is terminated (corresponding to S131), but the setup with the terminal C is not made (corresponding to S132).

The terminal C receives the probe response including the PBC information and the registrar information from the terminal B and stores its own role as the join terminal (corresponding to S205, S232, and S233). However, registration ready information is not included in the probe response from the terminal B (corresponding to S234). The terminal C waits for a while (corresponding to S210), and transmits a probe request including PBC information and information indicating that its own role is the join terminal (hereinafter, abbreviated as enrollee information) since its own role is the join terminal (corresponding to S230 and S231).

Until a probe response including PBC information, registrar information, and registration ready information is received, the terminal C repeats the probe request transmission at an arbitrary time interval and the probe response reception.

On the other hand, the terminal B returns a probe response including PBC information and registrar information to the terminal C during the reception period in relation to the probe request repeatedly transmitted from the terminal C (S115 to S117, S119, S170, S171, and S120). When the terminal B receives the probe request including the PBC information and the enrollee information after the reception period expires, the setup between the terminal B and the terminal C among source terminals of the stored probe requests is not made and the probe request from the terminal C is already stored, so that a MAC address of the received probe request matches a MAC address of the stored probe request from the terminal C (corresponding to S174 and S175). However, since another setup operation is impossible while the setup between the terminal A and the terminal B is in operation (corresponding to S176), the terminal B returns a probe response including PBC information and registrar information to the terminal C (corresponding to S120).

When a probe request including PBC information and enrollee information is received from the terminal C after completing the setup with the terminal A, the terminal B recognizes that its own role is the registration terminal and the setup is possible (corresponding to S115, S116, S119, and S170). Since the reception period has expired (corresponding to S172), a MAC address of a source terminal of a stored probe request from the terminal C is the same as a MAC address of a source terminal of a probe request most recently received from the terminal C, and the setup is possible (corresponding to S174, S175, and S176), the terminal B returns a probe response including PBC information, registrar information, and registration ready information to the terminal C (corresponding to S173), and waits for the setup to be started from the terminal C (corresponding to S153).

When the probe response including the PBC information, the registrar information, and the registration ready information is received from the terminal B (corresponding to S204, S205, and S234), the terminal C starts the setup from itself with the terminal B (corresponding to S235), waits for the setup to be completed (corresponding to S208), and terminates the join waiting operation.

When the setup is started from the terminal C (corresponding to S153), the terminal B starts the setup (corresponding to S154) and waits for the setup to be completed (corresponding to S131). When the setup with the terminal C has been completed (corresponding to S131), the terminal B terminates the registration waiting operation by deleting all the probe requests from the terminals A and C in the RAM 104 (corresponding to S127) since the setup with any one of the terminals A and C as the sources of the stored probe requests has been completed (corresponding to S132) and also the reception period expired (corresponding to S133).

As described above, the setup with the terminal B is able to be started from the terminals A and C as the join terminals. Since the setup is able to be started from a join terminal side in a conventional WPS, it is unnecessary to change a procedure of a setup process for the third operation example. The terminal B transmits a start notification to start the setup from the terminals A and C in the second operation example, but the setup is started from the terminals A and C by transmitting a probe response including registration ready information from the terminal B in the third operation example.

Fourth Operation Example

Figure 15:
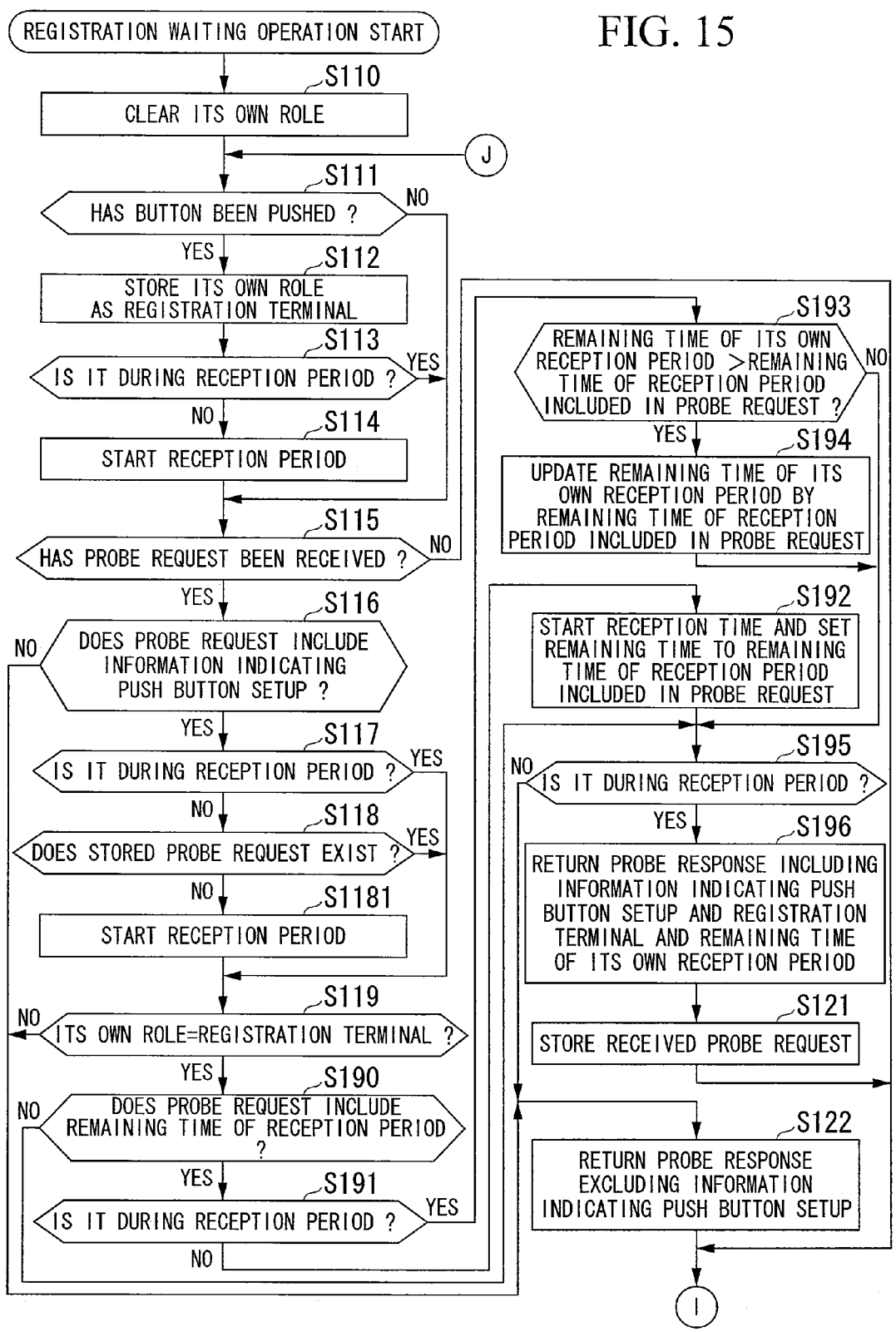
FIG. 15 is a flowchart showing a procedure of an operation (a registration waiting operation in a fourth operation example) of the digital still camera according to an embodiment of the present invention.
Figure 16:
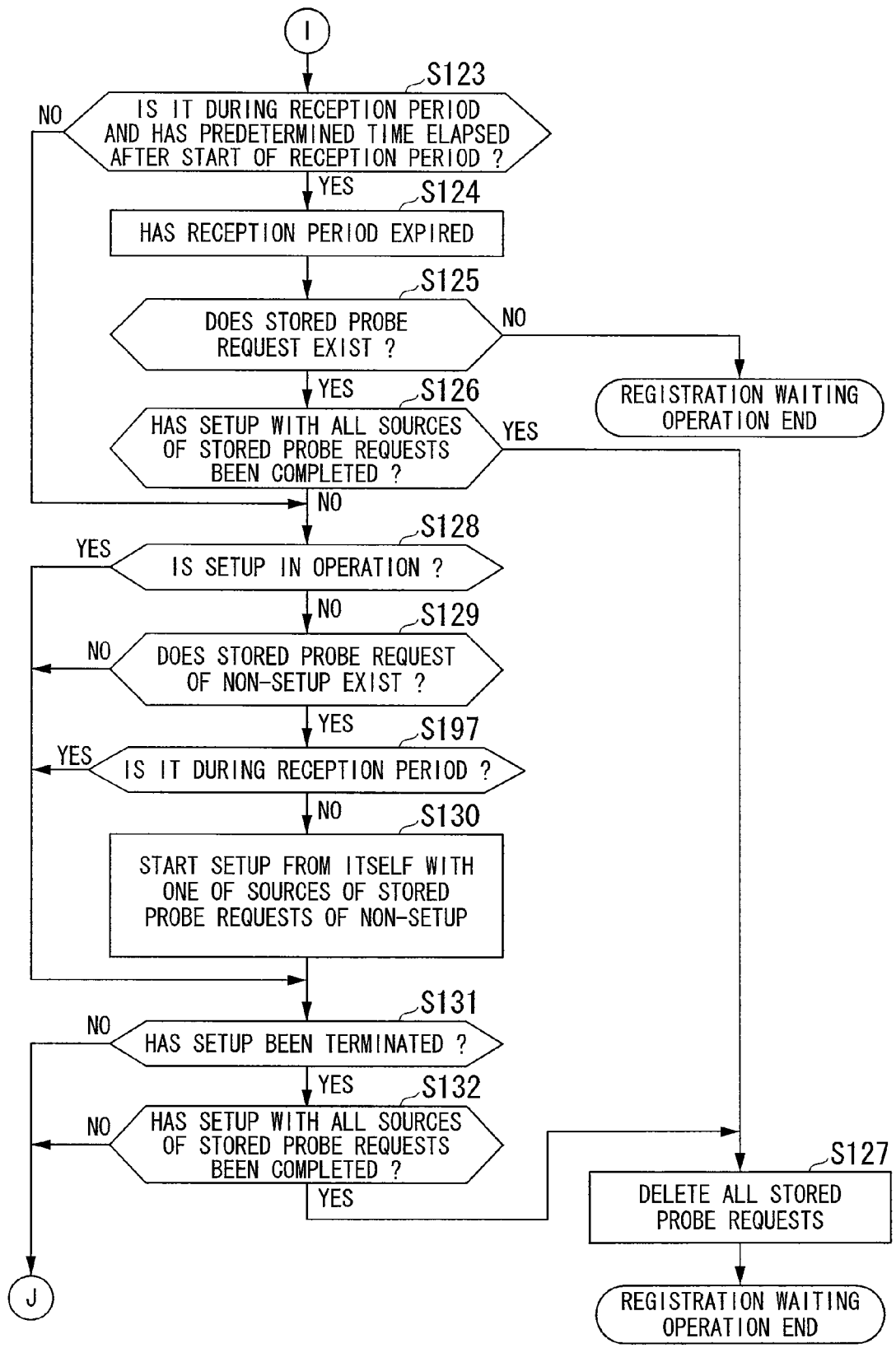
FIG. 16 is a flowchart showing a procedure of an operation (a registration waiting operation in the fourth operation example) of the digital still camera according to an embodiment of the present invention.
Figure 18:
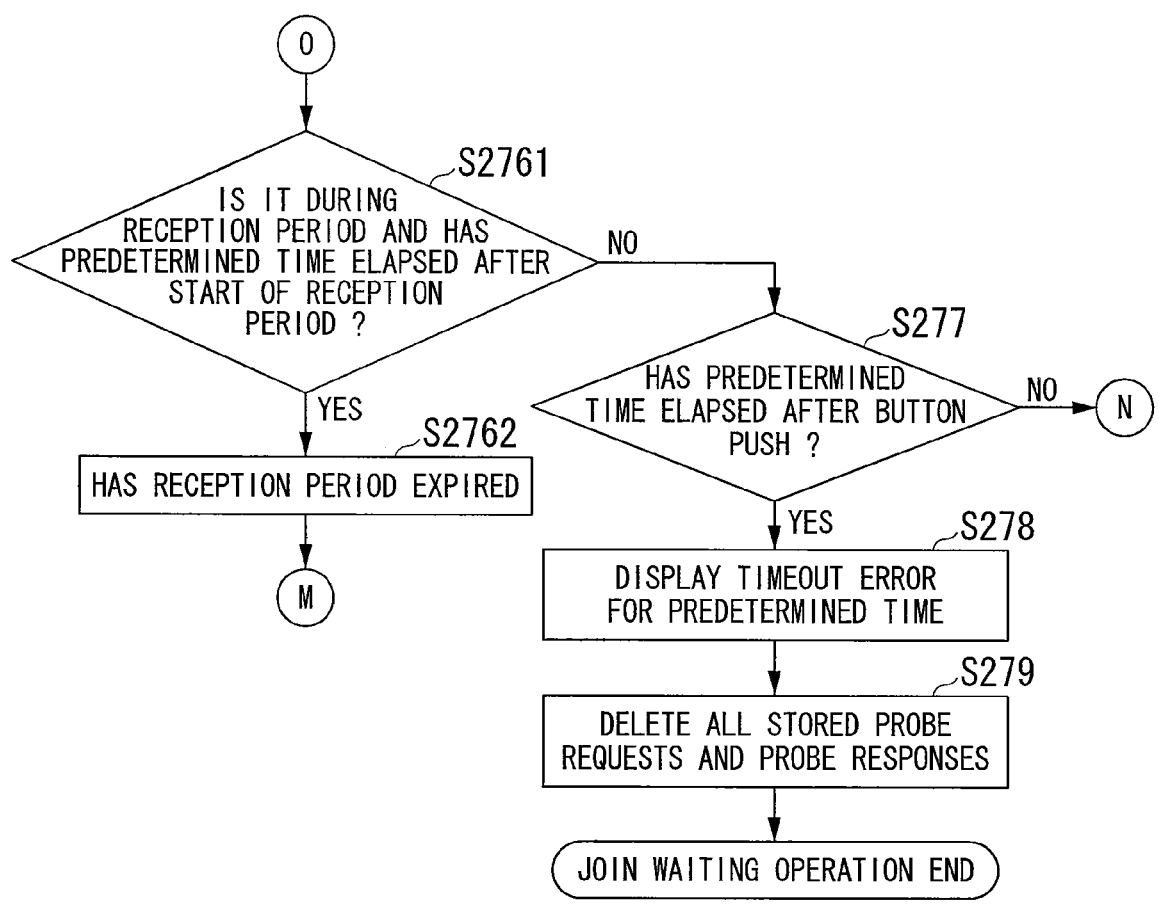
FIG. 18 is a flowchart showing a procedure of an operation (a join waiting operation in the fourth operation example) of the digital still camera according to an embodiment of the present invention.
Figure 19:
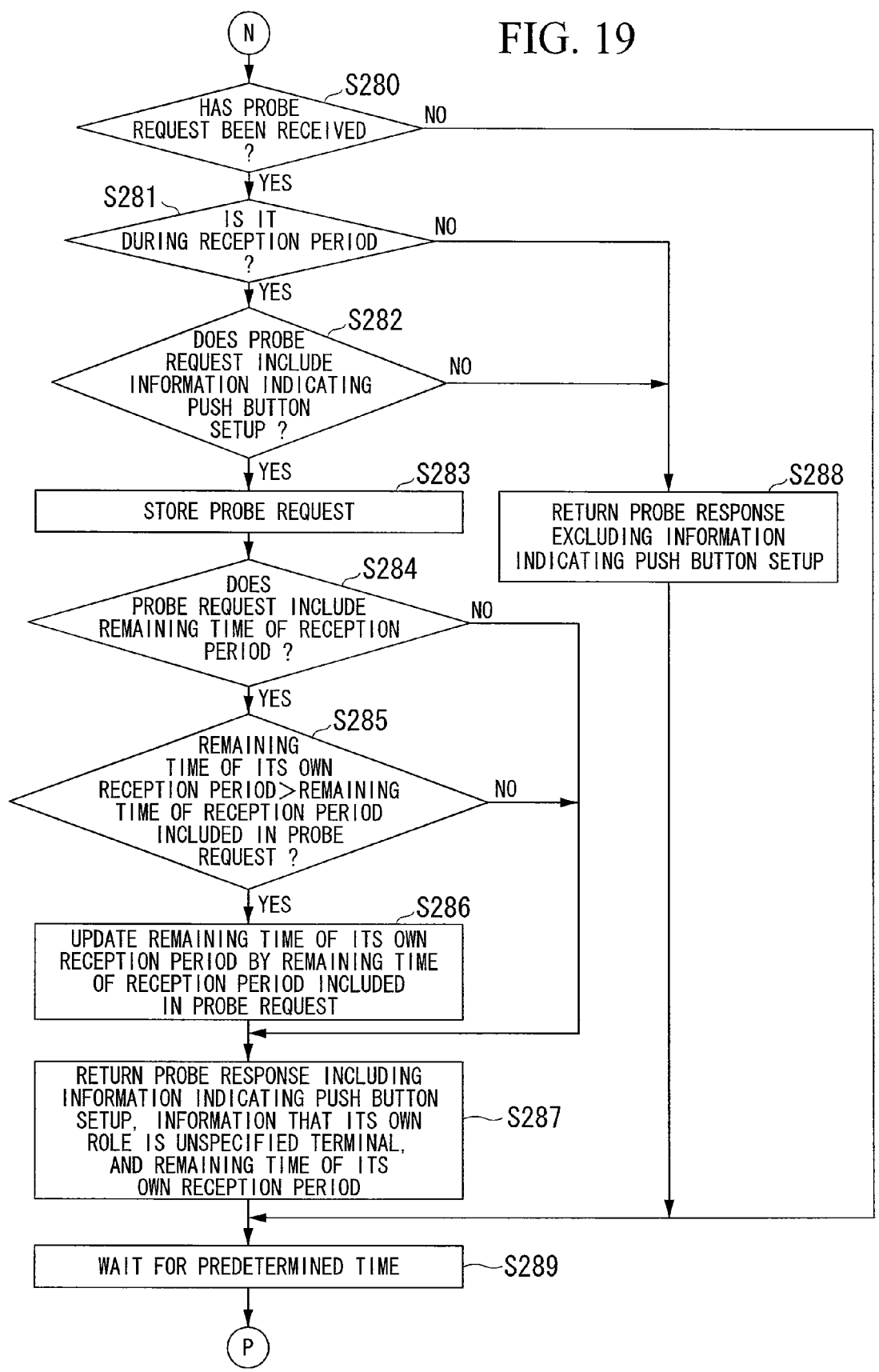
FIG. 19 is a flowchart showing a procedure of an operation (a join waiting operation in the fourth operation example) of the digital still camera according to an embodiment of the present invention.
Figure 20:
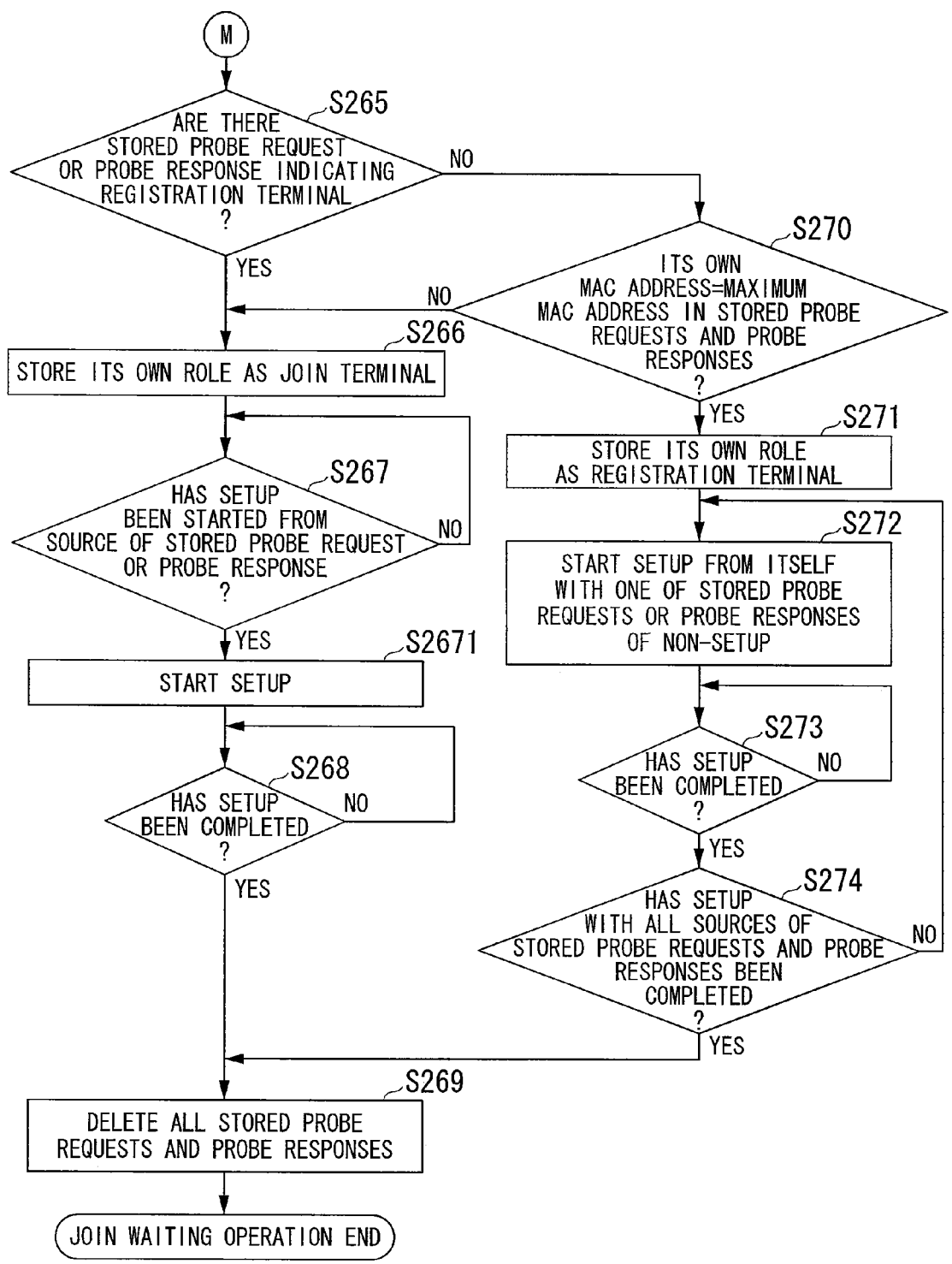
FIG. 20 is a flowchart showing a procedure of an operation (a join waiting operation in the fourth operation example) of the digital still camera according to an embodiment of the present invention.

Next, the fourth operation example will be described. FIGS. 15 and 16 show a procedure of a registration waiting operation in the fourth operation example. A difference between the procedure shown in FIGS. 3 and 4 and the procedure shown in FIGS. 15 and 16 is that the setup is started as needed even during the reception period in the procedure shown in FIGS. 3 and 4, but terminals mutually exchange the remaining times of reception periods using a probe request and a probe response, apply a shorter reception period, and start the setup as needed after completing the reception period in the procedure of FIGS. 15 and 16. Hereinafter, only parts different from those of the procedure shown in FIGS. 3 and 4 will be described.

When a probe request including PBC information is received and its own role is the registration terminal in S115, S116, and S119, the CPU 101 determines whether or not the received probe request includes information indicating the remaining time of the reception period (S190). When the probe request does not include the information indicating the remaining time of the reception period, the process proceeds to S195. On the other hand, when the probe request includes the information indicating the remaining time of the reception period, the CPU 101 determines whether or not it is during the reception period (S191).

When it is not during the reception period, the CPU 101 starts its own reception period, and sets the remaining time of the reception period to the remaining time of the reception period included in the probe request (S192). On the other hand, when it is during the reception period, the CPU 101 determines whether or not the remaining time of the reception period detected by itself is longer than the remaining time of the reception period included in the probe request by comparing the remaining times (S193). When the former remaining time is equal to the latter remaining time or when the former remaining time is shorter, the process proceeds to S195. On the other hand, when the former remaining time is longer, the CPU 101 updates the remaining time of its own reception period to the remaining time of the reception period included in the probe request (S194). Subsequently, the process proceeds to S195.

When the process has proceeded to S195, the CPU 101 determines whether or not it is during the reception period (S195). When it is not during the reception period, the process proceeds to S122. When it is during the reception period, the CPU 101 transmits a probe response including PBC information, information indicating a registration terminal, and the remaining time of its own reception period to a source terminal of the probe request through the external I/F 106 (S196). Subsequently, the process proceeds to S121.

When the setup is not in operation and a probe request for which the setup with a source terminal is not made exists among stored probe requests in S128 and S129, the CPU 101 determines whether or not it is during the reception period (S197). When it is during the reception period, the process proceeds to S131. On the other hand, when it is not during the reception period, the CPU 101 starts the setup from itself with one source terminal on the basis of probe request information from the source terminal with which the setup is not made among the probe requests stored in the RAM 104 (S130).

When the setup has been terminated and the setup with all source terminals of the stored probe requests has been completed in S131 and S132, the process proceeds to S127. On the other hand, when the setup has not been completed, the process returns to S111.

FIGS. 17 to 20 show a procedure of the join waiting operation in the fourth operation example. To clear previous setup information, the CPU 101 clears its own role stored in the RAM 104 (S250). Subsequently, the CPU 101 determines whether or not a button of its own device for instructing a connection to an ad-hoc network has been pushed (S251). As described above, the instruction of the connection to the ad-hoc network is possible not only by pushing a physical button mounted on a device, but also by selecting and deciding a menu or button displayed on an LCD.

When the button has not been pushed, the determination of step S251 is repeated. On the other hand, when the button has been pushed, the CPU 101 starts the reception period (S252)

and stores its own role as an unspecified terminal (E/R) in the RAM 104 (S253). Subsequently, the CPU 101 transmits a probe request including PBC information, information indicating that its own role is the unspecified terminal, and information indicating the remaining time of its own reception period through the external I/F 106 (S254). Subsequently, the CPU 101 determines whether or not a probe response has been received within a predetermined time after transmitting the probe request (S255).

When the probe response has not been received within the predetermined time after transmitting the probe request (for example, when all terminals do not belong to an ad-hoc network and a terminal capable of receiving the probe request does not exist), the process proceeds to S275.

On the other hand, when the probe response has been received within the predetermined time after transmitting the probe request, the CPU 101 determines whether or not the probe response includes PBC information and information indicating a registration terminal (S256).

When the probe response does not include at least one of the two information elements, the process proceeds to S275.

On the other hand, when the probe response includes the two information elements, the CPU 101 stores the received probe response in the RAM 104 (S257). When a probe response having the same content as the received probe response has been stored in the RAM 104, it is unnecessary to store the received probe response. Subsequently, the CPU 101 determines whether or not information indicating the remaining time of the reception period is included in the received probe response (S258). When the information indicating the remaining time of the reception period is not included, the process proceeds to S261. On the other hand, when the information indicating the remaining time of the reception period is included, the CPU 101 determines whether or not the remaining time of the reception period detected by itself is longer than the remaining time of the reception period included in the probe response by comparing the remaining times (S259).

When the former remaining time is equal to the latter remaining time or when the former remaining time is shorter, the process proceeds to S261. On the other hand, when the former remaining time is longer, the CPU 101 updates the remaining time of its own reception period to the remaining time of the reception period included in the probe response (S260). Subsequently, the CPU 101 determines whether or not its own device belongs to an ad-hoc network (S261). When its own device belongs to the ad-hoc network, the process proceeds to S263. On the other hand, when its own device does not belong to the ad-hoc network, the CPU 101 performs a process of generating the ad-hoc network (S262).

A terminal generating the ad-hoc network is able to receive a probe request from other terminals. Therefore, here, the probe request may be received, for example, by performing a process of belonging to an ad-hoc network of a probe response source without independently generating the ad-hoc network.

Subsequently, the process proceeds to S263.

When the process has proceeded to S263, the CPU 101 determines whether or not it is during the reception period and a predetermined time has elapsed after the start of the reception period (S263). When it is not during the reception period or when the predetermined time has not elapsed after the start of the reception period, the process proceeds to S280. On the other hand, when it is during the reception period and the predetermined time has elapsed after the start of the reception period, the CPU 101 terminates the reception period (S264) and determines whether or not information indicating a registration terminal is included in a probe request or a probe response stored in the RAM 104 (S265).

When a probe request including the information indicating the registration terminal does not exist and a probe response including the information indicating the registration terminal does not exist, the process proceeds to S270. On the other hand, when a probe request including the information indicating the registration terminal exists or when a probe response including the information indicating the registration terminal exists, the CPU 101 stores its own role as a join terminal in the RAM 104 (S266).

Subsequently, the CPU 101 determines whether or not the setup has been started from one terminal of source terminals of a probe request or a probe response stored (S267). When the setup has not been started, the determination of S267 is repeated. On the other hand, when the setup has been started, the CPU 101 starts its own setup in accordance with the start of the setup by the source terminal (S2671). Subsequently, the CPU 101 determines whether or not the setup has been completed (S268).

When the setup has not been completed, the determination of S268 is repeated. On the other hand, when the setup has been completed, the CPU 101 terminates the join waiting operation by deleting all the probe requests and the probe responses stored in the RAM 104 (S269).

On the other hand, when the process has proceeded to S270, the CPU 101 determines whether or not its own MAC address is a maximum value by comparing its own MAC address with each MAC address of the probe requests and the probe responses stored in the RAM 104 (S270). When its own MAC address is not the maximum value, the process proceeds to S266. On the other hand, when its own MAC address is the maximum value, the CPU 101 stores its own role as the registration terminal in the RAM 104 (S271). In the fourth operation example as described above, even when the registration terminal does not exist among terminals of which the buttons have been pushed, a terminal having a maximum MAC address becomes the registration terminal among the terminals desiring to join the ad-hoc network. Here, the determination by the maximum MAC address is made. Alternatively, for example, a terminal having a minimum MAC address may become the registration terminal. For example, the magnitude determination may be made on the basis of a value capable of uniquely identifying a terminal like a UUID.

Subsequently, the CPU 101 starts the setup from itself with one terminal with which the setup is not made among source terminals of probe requests and probe responses stored in the RAM 104 (S272). Subsequently, the CPU 101 determines whether or not the setup has been terminated (S273).

When the setup has not been terminated, the determination of S273 is repeated. On the other hand, when the setup has been terminated, the CPU 101 determines whether or not the setup with all the source terminals of the probe requests and the probe responses stored in the RAM 104 has been completed (S274). When the setup with one or more source terminals of the source terminals of the probe requests and the probe responses stored in the RAM 104 has not been completed, the process returns to S272. On the other hand, when the setup with all the source terminals of the probe requests and the probe responses stored in the RAM 104 has been completed, the process proceeds to S269.

On the other hand, when the process has proceeded to S275, the CPU 101 determines whether or not its own device belongs to the ad-hoc network (S275). When its own device belongs to the ad-hoc network, the process proceeds to S2761. On the other hand, when its own device does not belong to the ad-hoc network, the CPU 101 performs a process of generating the ad-hoc network (S276).

Subsequently, the CPU 101 determines whether or not it is during the reception period and a predetermined time has elapsed after the start of the reception period (S2761). When it is not during the reception period or when the predetermined time has not elapsed after the start of the reception period, the process proceeds to S277. When it is during the reception period and the predetermined time has elapsed after the start of the reception period, the CPU 101 terminates the reception period (S2762). Subsequently, the process proceeds to S265.

When the process has proceeded to S277, the CPU 101 determines whether or not a predetermined time has elapsed after pushing the button (S277). When the predetermined time has not elapsed, the process proceeds to S280. On the other hand, when the predetermined time has elapsed, the CPU 101 displays a timeout error on the display section 105 for predetermined-time (S278) and terminates the join waiting operation by deleting probe requests and probe responses stored in the RAM 104 (S279).

When the process has proceeded to S280, the CPU 101 determines whether or not a probe request has been received (S280). When the probe request has not been received, the process proceeds to S289. On the other hand, when the probe request has been received, the CPU 101 determines whether or not it is during the reception period (S281). When it is not during the reception period, the CPU 101 transmits a probe response excluding PBC information to a source terminal of the probe request through the external I/F 106 (S288). Subsequently, the process proceeds to S289.

On the other hand, when it is during the reception period, the CPU 101 determines whether or not PBC information is included in the probe request (S282). When the PBC information is not included in the probe request, the process proceeds to S288. On the other hand, when the PBC information is included in the probe request, the CPU 101 stores the probe request in the RAM 104 (S283). Subsequently, the CPU 101 determines whether or not information indicating the remaining time of the reception period is included in the received probe request (S284).

When the information indicating the remaining time of the reception period is not included, the process proceeds to S287. On the other hand, when the remaining time of the reception period is included in the received probe request, the CPU 101 determines whether or not the remaining time of the reception period detected by itself is longer than the remaining time of the reception period included in the probe request by comparing the remaining times (S285). When the former remaining time is equal to the latter remaining time or when the former remaining time is shorter, the process proceeds to S287. On the other hand, when the former remaining time is longer, the CPU 101 updates the remaining time of its own reception period to the remaining time of the reception period included in the probe request (S286).

Subsequently, the CPU 101 transmits a probe response including PBC information, information indicating that its own role is an unspecified terminal, and the remaining time of its own reception period to a source terminal of the probe request through the external I/F 106 (S287). Subsequently, the CPU 101 waits for a predetermined time to elapse (S289) and retransmits the probe request in S254.

Figure 21:
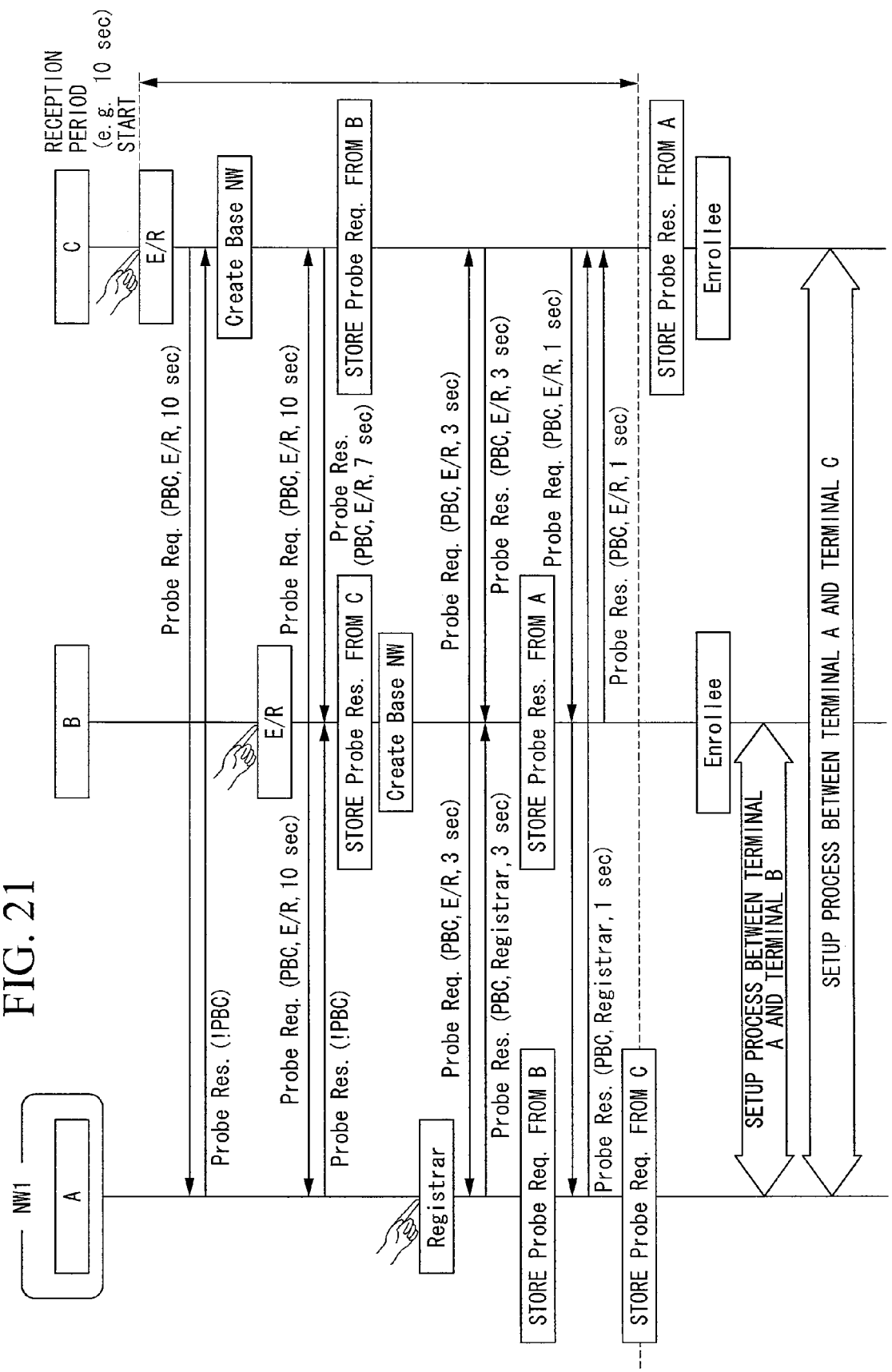
FIG. 21 is a sequence diagram showing a procedure of communication (communication in the fourth operation example) performed between digital still cameras according to an embodiment of the present invention.

FIG. 21 shows an operation example by the registration waiting operation and the join waiting operation described above. In the example shown in FIG. 21, terminals A, B, and C having the configuration of the DSC 10 exist.

When power is input, the terminal C starts the join waiting operation since its own device does not store the connection setup of the ad-hoc network (corresponding to S1 and S20). In the join waiting operation, the terminal A clears its own role. Subsequently, when the button is pushed, the terminal A starts the reception period (for example, 10 sec), stores its own role as the unspecified terminal (E/R) and transmits a probe request including information indicating button push setup (PBC information), information indicating that its own role is an unspecified terminal (E/R information), and the remaining time (here, 10 sec) of the reception period (corresponding to S250 to S254).

The terminal B waits for the button to be pushed in S251. At this time, since the terminal B does not belong to the ad-hoc network, an operation of receiving a probe request and returning a probe response is impossible.

When power is input, the terminal A starts the registration waiting operation since its own device has stored the connection setup of an ad-hoc network NW1 and the connection setup has been reflected (corresponding to S1 and S10). In the registration waiting operation, the terminal A clears its own role (corresponding to S110). At a time of point when the button of the terminal C has been pushed and the probe request has been transmitted, the button of the terminal A is not pushed (corresponding to S111). Accordingly, when a probe request including PBC information is received (corresponding to S115 and S116), the terminal A starts the reception period since it is not during the reception period and a stored probe request does not exist (corresponding to S117, S118, and S1181). At this time, since its own role is not set (corresponding to S119), the terminal A returns a probe response excluding PBC information to the terminal C (corresponding to S122).

The terminal C receives a probe response from the terminal A before the passage of a predetermined time (in this case, a reception waiting time of the probe response), but the probe response does not include PBC information (corresponding to S255 and S256). Since the terminal C does not belong to the ad-hoc network, an ad-hoc network formed from only the terminal C is generated (corresponding to S275 and S276).

At this time, it is during the reception period and the time to be timed-out has not elapsed after pushing the button (corresponding to S2761 and S277). Since the probe request is not received (corresponding to S280), the terminal C waits for a while (corresponding to S289), retransmits the probe request, waits for a probe response including PBC information, and waits for a probe request to be received from another device (corresponding to S254, S255, S256, and S280).

Then, after the button of the terminal B is pushed, the terminal B transmits a probe request including PBC information in the same operation as that of the terminal C. When the terminal A receives the probe request including the PBC information, a probe response excluding PBC information is transmitted to the terminal B since it is during the reception period and its own role is not set (corresponding to S115 to S117, S119, and S122).

When the terminal C receives a probe request including PBC information (corresponding to S280), the terminal C stores the probe request since it is during the reception period (corresponding to S281 to S283). When the remaining time of the reception period included in the probe request transmitted from the terminal B is 10 sec and at this time the remaining time of the reception period of the terminal C is 7 sec, the terminal C directly uses its own reception period (corresponding to S284 to S286).

Subsequently, the terminal C returns a probe response including PBC information, information indicating that its own role is an unspecified terminal (E/R information), and the remaining time (7 sec) of its own reception period to the terminal B (corresponding to S287), waits for a while (corresponding to S289), waits for a probe response including PBC information by retransmitting the probe request, and waits for a probe request to be received from another device (corresponding to S254, S255, S256, and S280).

Since an operation when the terminal B receives a probe response from the terminal A is the same as that when the terminal C receives a probe response from the terminal A, it is omitted. When the terminal B receives a probe response including PBC information from the terminal C (corresponding to S255 and S256), the terminal B stores the probe response (corresponding to S257). Since the remaining time of the reception period included in the received probe response is 7 sec which is shorter than 10 sec as the remaining time of its own reception period, the terminal B updates the remaining time of its own reception period to 7 sec (corresponding to S258 to S260).

When the transmission of the probe response from the terminal C is earlier than that of the probe response from the terminal A, the terminal B generates an ad-hoc network since it does not belong to an ad-hoc network (corresponding to S261 and S262). Since the reception period is not completed (corresponding to S263), the terminal B waits for a while (corresponding to S289), waits for a probe response including PBC information by retransmitting a probe request, and waits for a probe request to be received from another device (corresponding to S254, S255, S256, and S280).

When the button is pushed, the terminal A stores its own role as a registration terminal (registrar) (corresponding to S111 and S112). Thereafter, for example, when a probe request including PBC information repeatedly transmitted by the terminal B is received, the terminal A is in the reception period and is the registrar (corresponding to S115 to S117 and S119). Since the remaining time (here assumed to be 3 sec) of the reception period of the terminal B is included in the probe request, the terminal A is still in the reception period, and its own reception period is 3 sec, the terminal A moves on without doing anything (corresponding to S190, S191, and S193). Since it is during the reception period, the terminal A transmits a probe response including PBC information and registrar information and stores the probe request transmitted from the terminal B (corresponding to S195, S196, and S121).

Since an operation in which the terminal B receives a probe response, an operation in which the terminal C receives a probe request from the terminal B, and an operation in which the terminal C transmits a probe response to the terminal B are the same as the operations of transmitting and receiving a probe request and a probe response between the terminal B and the terminal C described above, they are omitted here.

For example, when a probe request including PBC information repeatedly transmitted by the terminal C has been received, the terminal A performs the same operation as when the probe request including the PBC information repeatedly transmitted by the terminal B has been received. A description regarding the operation content is omitted.

When a predetermined time has elapsed after the start of the reception period, the terminal A terminates the reception period (corresponding to S123 and S124). The terminal B and the terminal C as source terminals in stored probe requests exist, but the setup is not in operation at present and the setup with any terminal is not completed (corresponding to S125, S126, S128, and S129). Since the reception period has been completed, the terminal A starts the setup from itself with the terminal B (corresponding to S197 and S130).

On the other hand, when the predetermined time has elapsed after the start of the reception period and the reception period has expired (corresponding to S2761 and S2762), the terminal B stores its own role as a join terminal (enrollee) (corresponding to S266) since the probe response from the terminal A includes registrar information (corresponding to S265). When the setup from the terminal A has been started and completed (corresponding to S267, S2671, and S268), the terminal A terminates the join waiting operation by deleting all of probe requests and probe responses stored (corresponding to S269).

The terminal C stores its own role as the join terminal and waits for the setup to be started from the terminal A. Since the terminal C has the same operation as the terminal B, a description thereof is omitted here.

When the setup between the terminal A and the terminal B has been terminated, the setup is not in operation and the setup between the terminal A and the terminal C is not terminated (corresponding to S131, S132, S128, and S129). Since the reception period has expired, the terminal A starts the setup with the terminal C (corresponding to S197 and S130).

When the setup from the terminal A has been started and completed (corresponding to S267, S2671, and S268), the terminal C terminates the join waiting operation by deleting all of probe requests and probe responses stored (corresponding to S269).

Since the setup with the terminal C has been terminated and the setup with all source terminals (the terminals B and C) of stored probe requests has been completed (corresponding to S132), the terminal A terminates the registration waiting operation by deleting all the stored probe requests (corresponding to S127).

As described above, the setup between terminals is able to be made after the expiration of the reception period. In the case where the processing capability of the registration terminal is limited, it is effective to perform the setup after the expiration of the reception period in which a process related to the transmission and reception of the probe request or response is concentrated. Since the reception periods of terminals are updated on the basis of the reception period of a terminal of which the button has been first pushed, the reception periods recognized by the terminals are substantially the same.

Accordingly, the setup is able to be made between the registration terminal and the join terminal accepting the join within a predetermined reception period on the basis of one trigger after the expiration of the reception period.

Fifth Operation Example

Figure 22:
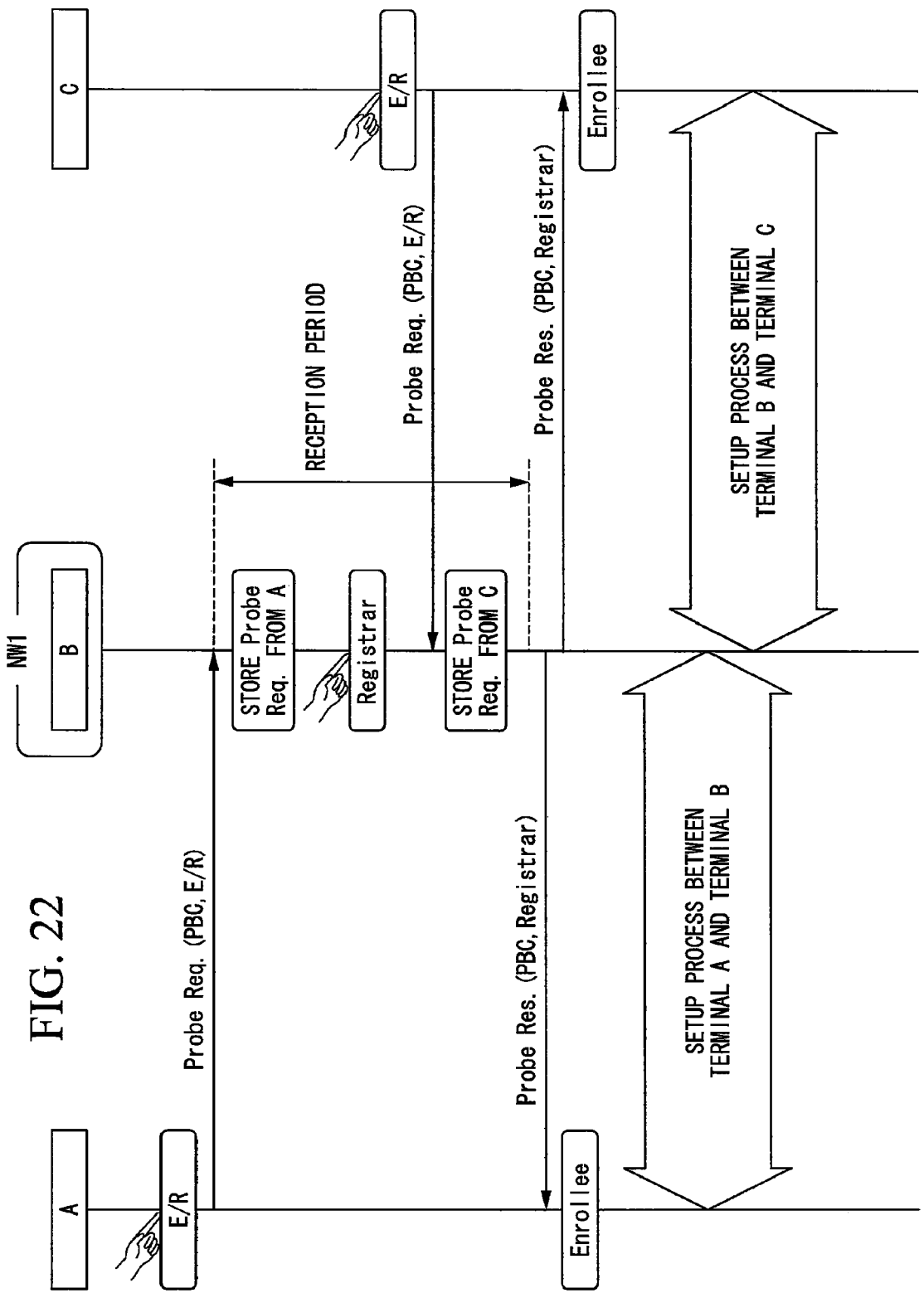
FIG. 22 is a sequence diagram showing a procedure of communication (communication in a fifth operation example) performed between digital still cameras according to an embodiment of the present invention.

Next, the fifth operation example will be described. FIG. 22 shows an operation example by a registration waiting operation and a join waiting operation in the fifth operation example. In the example shown in FIG. 22, terminals A, B, and C having the configuration of the DSC 10 exist.

When the button is pushed, the terminal A transmits a probe request including information indicating push button setup (PBC information) and information indicating that its own role is an unspecified terminal (E/R information).

The terminal B starts the reception period when its own button has been pushed or a probe request has been received from another terminal. In this example, when the probe request is received from the terminal A, the terminal B starts the reception period and stores the received probe request. When the button is pushed, the terminal B stores its own role as the registration terminal (registrar).

When the button is pushed, the terminal C transmits the probe request including the PBC information and the E/R information. When the probe request is received from the terminal C, the terminal B stores the received probe request. The terminal B does not transmit a probe response during the reception period. When the reception period has expired, the terminal B returns a probe response including PBC information and information indicating that its own role is the registration terminal (registrar information) to the terminals A and C.

When the probe response including the PBC information and the registrar information is received, the terminal A stores its own role as the join terminal (enrollee). Likewise, the terminal C also stores its own role as the join terminal (enrollee) when the probe response including the PBC information and the registrar information is received. Thereafter, the terminal B starts the setup with the terminal A, and the terminal B starts the setup with the terminal C when the setup with terminal A is terminated.

Sixth Operation Example

Figure 23:
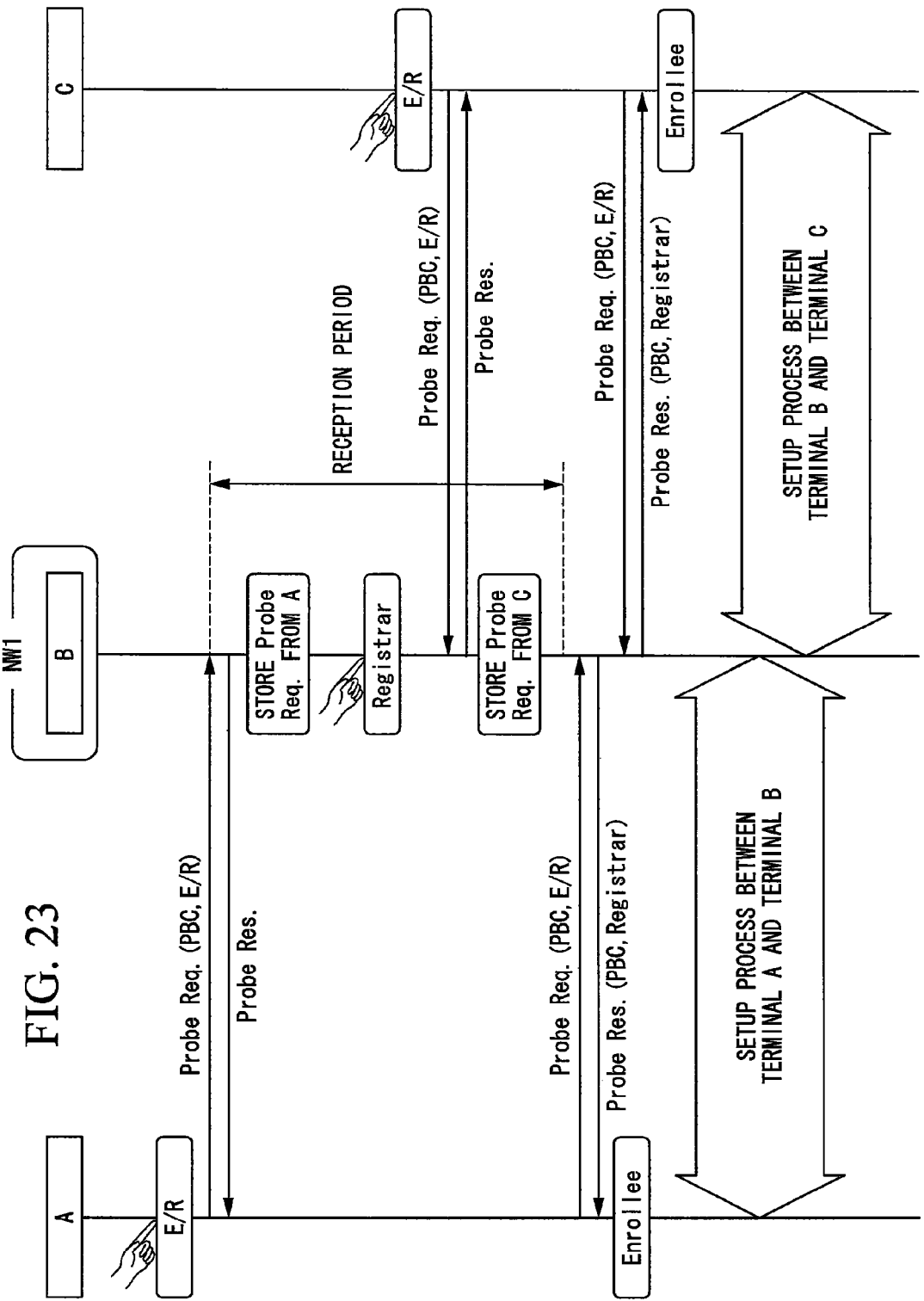
FIG. 23 is a sequence diagram showing a procedure of communication (communication in a sixth operation example) performed between digital still cameras according to an embodiment of the present invention.

Next, the sixth operation example will be described. FIG. 23 shows an operation example by a registration waiting operation and a join waiting operation in the sixth operation example. In the example shown in FIG. 23, terminals A, B, and C having the configuration of the DSC 10 exist.

When the button is pushed, the terminal A transmits a probe request including information indicating push button setup (PBC information) and information indicating that its own role is an unspecified terminal (E/R information).

The terminal B starts the reception period when its own button has been pushed or a probe request has been received from another terminal. In this example, when the probe request is received from the terminal A, the terminal B starts the reception period. Subsequently, the terminal B returns a probe response excluding PBC information and information indicating its own role to the terminal A, and stores the received probe request. When the button is pushed, the terminal B stores its own role as the registration terminal (registrar). The terminal A receiving the probe response excluding the PBC information and the information indicating its own role periodically transmits a probe request including PBC information and E/R information. The terminal B returns the above-described probe response for the probe request.

When the button is pushed, the terminal C transmits a probe request including PBC information and E/R information. When the probe request is received from the terminal C, the terminal B returns a probe response excluding PBC information and information indicating its own role to the terminal C and stores the received probe request. The terminal C receiving the probe response excluding PBC information and information indicating its own role periodically transmits the probe request including the PBC information and the E/R information. The terminal B returns the above-described probe response for the probe request.

When the probe request including PBC information and E/R information is received from the terminal A after the expiration of the reception period, the terminal B returns a probe response including PBC information and information indicating that its own role is a registration terminal (registrar information) to the terminal C. When the probe request including PBC information and E/R information is received from the terminal C after the expiration of the reception period, the terminal B returns a probe response including PBC information and registrar information to the terminal C.

When the probe response including the PBC information and the registrar information is received, the terminals A and C store their own roles as the join terminals (enrollees). Thereafter, the terminal B starts the setup with the terminal A, and the terminal B starts the setup with the terminal C when the setup with terminal A is terminated.

Seventh Operation Example

Figure 24:
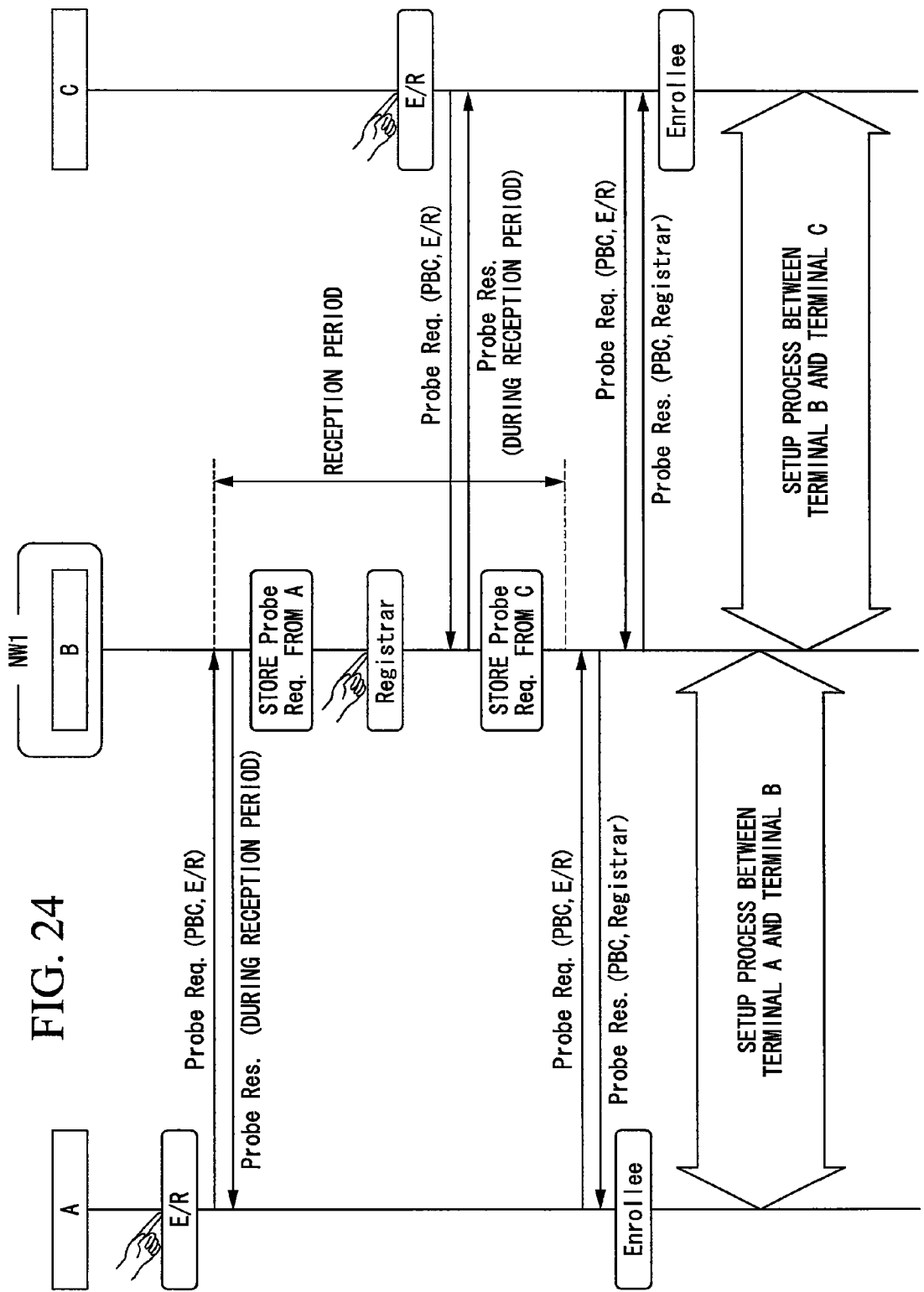
FIG. 24 is a sequence diagram showing a procedure of communication (communication in a seventh operation example) performed between digital still cameras according to an embodiment of the present invention.

Next, the seventh operation example will be described. FIG. 24 shows an operation example by a registration waiting operation and a join waiting operation in the seventh operation example. In the example shown in FIG. 24, terminals A, B, and C having the configuration of the DSC 10 exist. The example shown in FIG. 24 is substantially the same as the example shown in FIG. 23, but they are different in that a probe response to be returned includes information indicating that it is during a reception period, excludes information including PBC information, and excludes information indicating its own role when a probe request including PBC information and E/R information has been received from the terminals A and C by the terminal B within the reception period.

According to this embodiment as described above, a terminal serving as a registration terminal associates join requests (probe requests) received from a plurality of terminals with one trigger for performing the connection setup of the ad-hoc network, performs connection setup to make the plurality of terminals join an ad-hoc network in response to the join requests, so that the plurality of terminals are able to collectively perform the connection setup for joining the ad-hoc network.

That is, according to the present invention, a plurality of devices are able to collectively perform the connection setup for joining a wireless network by performing the connection setup to make a plurality of external terminals join the wireless network in response to join requests and by associating the join requests received from the plurality of external terminals with one trigger.

An opportunity for a connection of a terminal that must not be connected is reduced by enabling the connection setup to be made even after the expiration of a reception period and by shortening a period of accepting a join request.

The embodiments of the present invention have been described in detail with reference to the drawings. However, specific configurations are not limited to the embodiments and may include any design change in the scope without departing from the subject matter of the present invention. For example, the case where the present invention is applied to an ad-hoc mode has been described above, but the present invention may be applied to an infrastructure mode according to security tolerance.

What is claimed is:

1. A wireless communication terminal comprising:
   a trigger reception section which receives a predetermined trigger;
   a join request reception section which receives a join request to a wireless network by wireless communication from an external terminal which doesn't join the wireless network of the wireless communication terminal; and
   a connection setup section which performs connection setup and authorizes joining the wireless network for a plurality of external terminals when the join request received by the join request reception section has received the join request from a plurality of external terminals during a reception period corresponding to one trigger received by the trigger reception section, and doesn't perform the connection setup for the join request received from the external terminal after expiration of the reception period.

2. The wireless communication terminal according to claim 1,
wherein the connection setup section prevents the reception period from being extended during the reception period.

3. The wireless communication terminal according to claim 2,
wherein the connection setup section shortens the reception period on the basis of information attached to the join request.

4. The wireless communication terminal according to claim 1,
wherein the connection setup section performs the connection setup during the reception period or after the expiration of the reception period.

5. The wireless communication terminal according to claim 2,
wherein the connection setup section performs the connection setup during the reception period or after the expiration of the reception period.

6. The wireless communication terminal according to claim 1, further comprising a storage section which stores join request information regarding the join request received from the external terminal within the reception period,
wherein the connection setup section performs the connection setup for each of the plurality of external terminals from which join requests have been received within the reception period on the basis of the join request information stored in the storage section.

7. The wireless communication terminal according to claim 2, further comprising a storage section which stores join request information regarding the join request received from the external terminal within the reception period,
wherein the connection setup section performs the connection setup for each of the plurality of external terminals from which join requests have been received within the reception period on the basis of the join request information stored in the storage section.

8. A connection setup method for use in a wireless network, comprising:
receiving a predetermined trigger;
receiving a join request to the wireless network by wireless communication from an external terminal which doesn't join the wireless network of a wireless communication terminal;
storing join request information regarding the join request received by a trigger reception section from the external terminal within a reception period corresponding to one trigger; and
performing connection setup to make each of a plurality of external terminals from which join requests have been received within the reception period join the wireless network on the basis of the join request information stored in a storage section.

* * * * *